United States Patent
Amulu et al.

(10) Patent No.: US 12,124,460 B2
(45) Date of Patent: Oct. 22, 2024

(54) DEEP MINING OF ENTERPRISE DATA SOURCES

(71) Applicant: SAP SE, Walldorf (DE)

(72) Inventors: James Michael Amulu, Chennai (IN); Ranganathan Natarajan, Bangalore (IN)

(73) Assignee: SAP SE, Walldorf (SE)

( * ) Notice: Subject to any disclaimer, the term of this patent is extended or adjusted under 35 U.S.C. 154(b) by 0 days.

(21) Appl. No.: 18/073,314

(22) Filed: Dec. 1, 2022

(65) Prior Publication Data
US 2024/0184793 A1 Jun. 6, 2024

(51) Int. Cl.
*G06F 16/2458* (2019.01)

(52) U.S. Cl.
CPC .............................. *G06F 16/2465* (2019.01)

(58) Field of Classification Search
CPC ................................................. G06F 16/2465
See application file for complete search history.

(56) References Cited

U.S. PATENT DOCUMENTS

| | | | |
|---|---|---|---|
| 7,558,726 B2 | 7/2009 | Kraiss et al. | |
| 7,848,909 B2 | 12/2010 | Kraiss | |
| 8,484,255 B2 | 7/2013 | Amulu et al. | |
| 8,880,440 B2 | 11/2014 | Seidler et al. | |
| 8,949,291 B2 | 2/2015 | Amulu et al. | |
| 9,501,567 B2 | 11/2016 | Lemcke et al. | |
| 9,519,701 B2 | 12/2016 | Amulu et al. | |
| 9,665,351 B2 | 5/2017 | Amulu | |
| 11,144,383 B2 | 10/2021 | Amulu et al. | |
| 11,361,004 B2 | 6/2022 | Han et al. | |
| 2003/0028563 A1* | 2/2003 | Stutz ..................... | G06F 40/166 715/236 |
| 2007/0226640 A1* | 9/2007 | Holbrook .............. | G06F 16/951 715/765 |
| 2008/0033970 A1* | 2/2008 | Jones ................... | G06F 16/9535 |
| 2008/0140612 A1* | 6/2008 | Dettinger .............. | G06F 16/242 |
| 2011/0119258 A1* | 5/2011 | Forutanpour .......... | H04L 51/48 707/723 |
| 2012/0254143 A1 | 10/2012 | Varma et al. | |
| 2014/0130008 A1 | 5/2014 | Amulu | |

(Continued)

OTHER PUBLICATIONS

Databricks, "Hadoop," downloaded Nov. 21, 2022, from https://www.databricks.com/glossary/hadoop, pp. 1-14.

(Continued)

*Primary Examiner* — Cam Y T Truong
(74) *Attorney, Agent, or Firm* — Klarquist Sparkman, LLP

(57) ABSTRACT

Methods and apparatus are disclosed for deep mining of data sources. A deep miner provides extended reach into available structured databases and/or unstructured data sources. Direct evaluation of columns for relevance to a client query provides a wider array of columns having potential relevance, compared to conventional tools relying on table evaluation. Direct column evaluation is extended to unstructured data sources. A broad interface extends the reach of search seamlessly across a wide range of structured and unstructured data sources. Disclosed techniques provide superior results with reduced computing resource utilization. Limitations of human expertise are overcome. Further efficiencies are achieved through caching, ranking of columns or results, search refinement, and customized responses.

13 Claims, 10 Drawing Sheets

(56) References Cited

U.S. PATENT DOCUMENTS

| | | |
|---|---|---|
| 2014/0136257 A1 | 5/2014 | Amulu |
| 2014/0143270 A1 | 5/2014 | Amulu et al. |
| 2014/0149093 A1 | 5/2014 | Amulu |
| 2015/0106125 A1* | 4/2015 | Farooq .................. G16H 40/20 705/3 |
| 2015/0161239 A1* | 6/2015 | Stepinski ............ G06F 16/3325 707/765 |
| 2015/0310071 A1* | 10/2015 | Brew .................. G06F 16/2477 707/767 |
| 2015/0324422 A1 | 11/2015 | Elder |
| 2016/0171050 A1 | 6/2016 | Das |
| 2016/0224641 A1* | 8/2016 | Elias .................. G06F 16/2358 |
| 2020/0136836 A1* | 4/2020 | Schiattarella ....... H04L 63/0823 |
| 2020/0192913 A1 | 6/2020 | Tv et al. |
| 2020/0219006 A1 | 7/2020 | Wang |
| 2021/0073655 A1 | 3/2021 | Portisch et al. |
| 2021/0191923 A1 | 6/2021 | Amulu et al. |
| 2022/0083605 A1* | 3/2022 | Duishoev ................. G06N 5/02 |
| 2023/0161760 A1* | 5/2023 | James ................. G06F 21/6218 707/759 |

OTHER PUBLICATIONS

IBM, "Object Storage," available from https://www.ibm.com/cloud/learn/object-storage, 9 pages (May 2019).

Mongodb, "Database References," downloaded Dec. 1, 2022, from https://www.mongodb.com/docs/manual/reference/database-references/, pp. 1-4.

Wikipedia, "Document-oriented Database," downloaded Nov. 21, 2022, from https://en.m.wikipedia.org/wiki/Document-oriented_database, pp. 1-17.

Wisdahl, "Meta Database—Data Dictionary," available from https://ericwisdahl.wordpress.com/2009/04/26/meta-database-data-dictionary/, pp. 1-3 (Apr. 2009).

Extended European Search Report dated Jun. 20, 2024, from European Patent No. 23209366.6, 11 pages.

* cited by examiner

DEEP MINING OF ENTERPRISE DATA SOURCES

BACKGROUND

Tools for database search are often limited in the extent to which they can harness the available data. Conventional tools can access the database in inflexible ways and consequently can miss relevant data. To overcome this limitation, expert level knowledge of the database organization can be required. Furthermore, conventional tools can often be limited to accessing one particular database type. Searching multiple databases can require individual searches on each database, with different expert support for each. As database environments increase in size and complexity, no single individual may have adequate expertise to address a particular need, even for a single database. As heterogeneous environments are increasingly used, the challenges multiply. Accordingly, there remains a need for improved technology for automated deep access to databases and other data sources.

SUMMARY

In brief, the disclosed technologies are directed to various innovative technologies for deep access to data sources. A general principle is to expend initial effort in extending the reach of a search, to reap subsequent benefits: fast convergence to desired results, high likelihood of finding optimal results, and/or large reduction in computing resource consumed—with no expert-level knowledge of the available data sources required. The term "deep" refers herein to the ability of disclosed technologies to find query results beyond the reach of some conventional tools. The term "mining" refers to an approach that can perform search based on relevance to an instant client query—which can include relevance of results, or relevance of columns to be searched. Examples of the disclosed technologies are referred to herein as "deep miners," and can be apparatus or methods, implementing or implemented as services or other software applications.

In one aspect, direct identification of columns can extend the reach of search within a given data source. In another aspect, a broad interface, even including seamless integration of queries to structured and unstructured sources, extends the reach of search across multiple data sources. Innovative deep miners can advantageously implement one or both of these features, and optionally numerous other features described herein.

In certain examples, the disclosed technologies are implemented as a method by a computer. One or more search attributes are extracted from a client query. Based on the search attribute(s), one or more columns relevant to the client query are directly identified from a search universe including one or more data sources. Respective database queries are executed on the identified column(s) to obtain results for the client query. Respective hierarchy paths are determined for the results. A response to the client query is formulated based on the results and the hierarchy paths, and transmitted to a destination.

In further examples, the disclosed technologies are implemented as computer-readable media storing instructions which, when executed by one or more hardware processors, cause the hardware processor(s) to perform operations for handling a client query received from a client. The client query is associated with a search key and a search range, and the client is authorized to access a plurality of data sources including a structured first data source and an unstructured second data source. The operations include using dictionaries of the first data source to find a first column relevant to the search key, and planning a first database query against the first column for the search range. The first database query is executed to obtain a first result, and a first hierarchy path (in the first data source) of the first result is traced. The operations also include using metadata of the second data source to find a second column relevant to the search key, and planning a second database query against the second column for the search range. The second database query is executed to obtain a second result, and a second hierarchy path (in the second data source) of the second result is traced. The operations further include collating the first and second results for transmission to the client with the first and second hierarchy paths.

The foregoing and other objects, features, and advantages of the invention will become more apparent from the following detailed description, which proceeds with reference to the accompanying figures.

DETAILED DESCRIPTION

Overview

Figure 1:
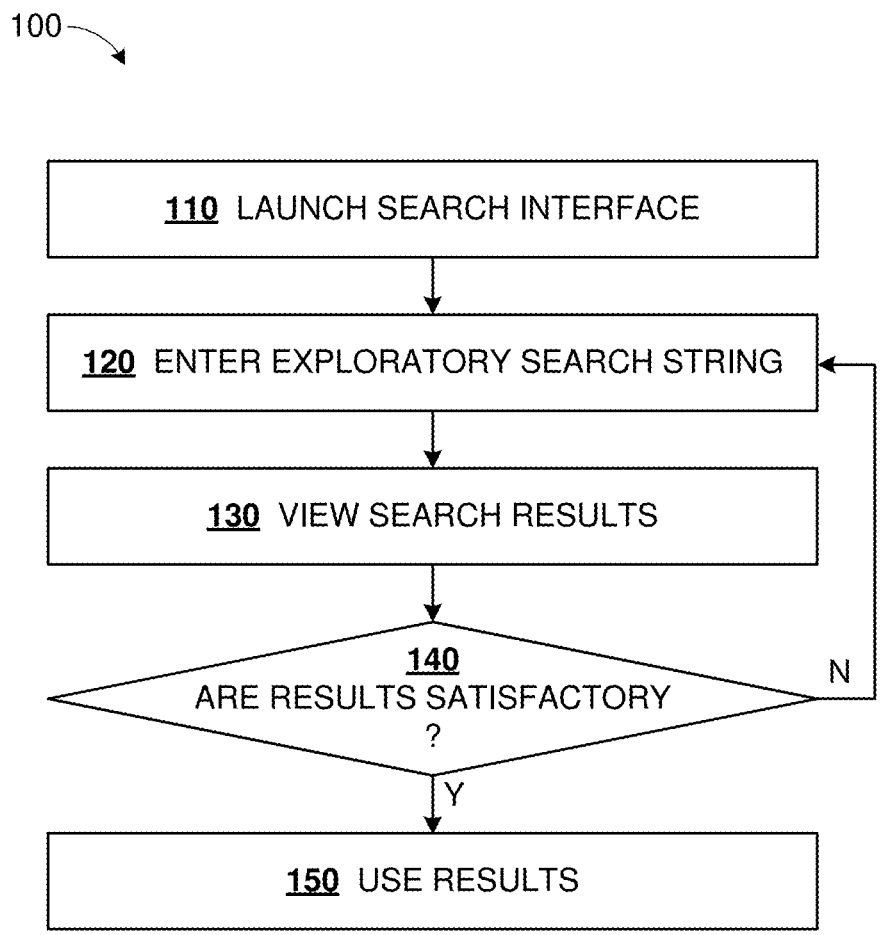
FIG. 1 is a flowchart illustrating a conventional exploration method for providing search results to a user.

Database environments provide information to address user needs. In a primitive database, there may be only one place to look for relevant information but, as database environments grow, relevant information for even a single query can be found widely distributed over multiple tables and even multiple databases. Determining where to look has become a challenge which sometimes requires expert-level knowledge of the tables and relationships in a database, and can require cross-domain knowledge when relevant data is spread across multiple databases. Still further, as the scale of database growth increases, no single person may have the requisite knowledge to identify the most relevant locations of sought data.

Another aspect of the problem is that a diversity of data sources are often available. Some may be structured while others may be unstructured. Conventionally, some types of data sources may be queried independently using specialized, often vendor-specific tools, which requires extra efforts and inhibits effective utilization of available data sources.

A database query handler (sometimes called a "database engine") has a front-end aspect, namely receiving a client query; an internal routing aspect (identifying one or more targets for corresponding database queries, e.g. determining where to search); and a back-end aspect, namely planning and executing a database query on each target.

Natural language queries have become popular to ease a portion of the expertise issue. By allowing a non-technical or non-expert user to query databases without knowledge of SQL, ABAP, or other database languages, natural language systems can address the front-end aspect of handling database queries. However, natural language systems conventionally hand off to conventional database query handlers, without addressing the routing aspect.

If a target is not explicitly specified by a client, internal routing is conventionally handled at the table level, e.g. by picking a table deemed most relevant to an instant client query. The motivation to adopt a table-based approach can be as simple as a matter of numbers: whereas commercial database deployments can commonly have about ten to about a thousand tables, the corresponding number of columns can be an order of magnitude larger—from about a hundred to about ten thousand—and some database deployments can exceed these numbers by orders of magnitude.

Indeed, the table selection approach can be satisfactory for simple queries. To find one specific record, e.g. a part in a manufacturer's database, it can be sufficient to search by Part Number in the obvious location of a Parts table. But, real-world applications can be more complex. Particularly, a database user may not want merely a specific record, but may want to find related records and discern patterns. Limiting search to one likely table can often miss other tables that can be more fruitful for a user's quest.

Some examples below are described in context of a vehicle having a suspension problem. The vehicle identification number (VIN) may be found in many tables, in many databases—every stage or aspect of the vehicle's life cycle (manufacturing, shipping, dealer, service, government, insurance) can have its own database. Some tables can use VIN for key, while in others the VIN can be a foreign key. A conventional database engine can choose to look at table having VIN as local key, but more relevant information could be found in a Manufacturing Record or a Service Record table where VIN is a foreign key.

Other search attributes, such as "suspension," may not be found as any column label but rather is a value that could be found in some problem descriptions, e.g. in a Service Records table. Without domain expertise, selecting a table that has most relevance for such a search can be a challenge. Indeed a Problem Description column is unlikely to be a local key (or foreign key) in any table.

Some conventional approaches to these problems are based on extemporaneous exploration, which can be computationally burdensome, time-consuming, and greatly dependent on a user's skill level—without assurance of caching optimal or near-optimal results.

In one aspect, the disclosed technologies address the where-to-look problem by bypassing evaluation of tables and proceeding directly to evaluate columns. One reason the column evaluation approach is powerful is that it can reach into column descriptions and categorical values of the columns to assess relevance. To illustrate, column evaluation can find "suspension" as a value of a Subsystem or Subassembly column in a service or manufacturing database, which can be beyond the reach of conventional table-level database engines. Another advantage of column evaluation is that multiple columns can be identified and ranked, to select more promising columns and improve efficiency.

While the column evaluation approach can incur a 10× computational burden evaluating columns instead of tables, this can be a one-time burden and can be performed on a relatively low volume of metadata. In the conventional approach, a user may save computation evaluating tables, but subsequent exploration can entail many search iterations, each iteration performed on a relatively large volume of data, dwarfing any initial computational saving.

A simple illustration may help. In a conventional approach, the user may use 1000 computer cycles choosing one among 1000 tables to search for a particular client query, and may perform 20 successive search iterations over 1,000,000 records each, at one computer cycle per record. Thus, the total computer usage is 1000+(20×1,000,000)=20,001,000 cycles, even without counting additional table evaluations for successive iterations. In contrast, with the disclosed technologies, the user can use two search iterations, a first iteration for the query as presented, and a second iteration to find records related to the best results of the first iteration. The user's total computer usage is 10,000 computer cycles to choose among 10,000 columns, plus two search iterations over the 1,000,000 records for a total of 10,000+(2×1,000,000)=2,010,000 cycles, which is about a factor of ten saving over the conventional approach. As this simple example illustrates, the burden of evaluating a large number of columns is amply compensated by being able to home in quickly on desired data. The disclosed technologies can provide a substantial computational advantage in addition to other advantages described herein.

In another aspect, the disclosed technologies address the where-to-look problem by distributing database queries across multiple data sources. The principle is the same. Computation incurred up-front, in querying multiple data sources rather than just one convenient data source, can be recouped by more quickly finding results from a less accessible data source. In the vehicle suspension problem, a user at a dealer may have easy access to the dealership's service records, but with conventional technology can easily miss that the same vehicle was previously serviced for a similar problem at another dealership. Alternatively, the relevant data source could belong to the manufacturer, where a table may provide information regarding high defect rates on a particular batch of parts, and the manufacturer's database can be built on a completely different database platform.

Some features of the disclosed technologies that enable concurrent access to multiple data sources (transparently to the client) are certificate based authorizations and broad interface capabilities. Certificates enable the client query to be distributed to all databases for which the client is authorized, without requiring the client to provide credentials for all databases each time the client issues a client query, while also maintaining security of those databases.

In some example deep miners, broad interface capabilities support both structured databases and unstructured data sources. Communication with structured databases can often be performed using common protocols such as SQL or ABAP, with some implementation variations between vendors. For unstructured sources, innovative miners can learn a map of customized organizations as often found with unstructured sources. In between, plug-ins can be used for new or less common structured databases, as needed for their respective vendor-provided application programming interfaces (API). In some examples, a deep miner can learn a map of an unstructured data source bottom-up, e.g. by searching for a specific field value (e.g. Name=James) and then utilizing API functions to trace the data field upward to a record (e.g. document) and data pool (e.g. collection). In other examples, the map can be learned top-down, e.g. by enumerating all data pools (collections) within the data source, then iterating over data pools (collections) to enumerate the records (documents) in each collection, and so forth.

Spreading database queries across multiple columns or multiple databases can generate results from diverse sources, and it can be desirable to keep track of where each result was obtained. To this end, examples of the disclosed technology provide universally unique specifications for the results. To illustrate, a record or field value is found by search on a particular column of a particular table, which in turn is organized under a particular schema of a particular database. Using the database query which generated a given result (e.g. record), identifiers of the column, table, schema, and database can be traced successively and aggregated (e.g. by concatenation) into a precise qualifier for the result. The aggregated qualifier is dubbed a "hierarchy path" herein. A hierarchy path can also be constructed for results from unstructured data sources, although details may vary from one unstructured data source to another. One column search can hit on multiple records, each of which can have the same hierarchy path, being further distinguished by e.g. individual keys of the records. Thus, hierarchy paths can be determined on a column basis, and can be constructed before the database query on that column is executed.

The disclosed technologies can be widely used in many application areas. While suitable data storage environments are commonly found in an enterprise setting—whether commercial, government, or educational—this is not a requirement, and the disclosed technologies can also be applied to legal research, scientific research, news archives, social media, other web applications, and many other applications involving structured or unstructured data sources.

Illustrative Scenario

Several examples herein are illustrated using a common scenario related to a suspension problem reported on a vehicle. In this scenario a service manager Tom at an automobile dealership has received a vehicle with a suspension problem, and seeks information that may help in understanding the root cause of the problem, whether the problem is common or recurrent, or whether the manufacturer has implemented a fix. The data environment includes a structured database at the dealership, but Tom also has authorization for affiliated databases belonging to other dealerships (some using the same database platform as Tom's dealership, some using a different vendor's technology), the manufacturer (including a structured database and two unstructured data sources for correspondence and documentation), as well as a subscription to two industry sources—a parts database and an unstructured news data source on a different platform than the manufacturer's unstructured data sources. Unsurprisingly, Tom has some familiarity with his in-house database, albeit not at the level of a database expert, and very little knowledge of affiliated databases.

Tom's dealership has a database expert Jerry who Tom has called on in the past to help with local database search. Jerry has expert knowledge of the in-house database and could similarly navigate other dealerships' databases using the same platform, but his technological knowledge is much less for other data sources that Tom has access to. As an added complication, Jerry himself only has access to the local dealership's database.

Tom and Jerry consider whether some other expert could help them. The manufacturer's staff are likely to be cooperative, but they are in other country, and language and time zones are obstacles. Neither of the industry sources is known for strong technical support. Tom and Jerry face a challenge.

The disclosed technologies overcome all of these problems. As described herein, a systematic approach can transparently access all the data sources Tom has access to, and the mining approach can find columns having relevant information even without expert knowledge of the data sources involved. Tom can enter a client query with the vehicle identification number (or vehicle model), "suspension" and "problem" and an inventive data miner can do the rest. In particular, the inventive data miner can find all the following nuggets, any of which could be valuable information for Tom: (1) reports of the same problem concentrated at dealerships in Tom's region (with dealerships receiving vehicles from other plants free of this problem), (2) manufacturer's incoming parts inspection showing a high defect rate for a suspension linkage part. (3) manufacturer documents showing a change in part supplier a month ago, (4) an industry parts database showing that the part in question is out-of-stock, with no restocking date, (5) industry rumors of possible recall for this vehicle model.

Some of these nuggets rely on evaluation of columns for relevance. No. 3 (supplier change) could be found in a Parts Supplier Change Log, which is not likely to be considered a priori as a highly relevant table. However, this table could have a Subsystem column having "suspension" as one of a list of categorical values. The Subsystem column can have a high relevance score. Similarly, no. 5 (recall rumor) could be found in a general purpose news data pool, not obviously high relevance. However, a News Category column could have a list of categorical values including "recall notice." the description of which includes the word "problems," allowing an automated tool to give this column a relevance score high enough for the column to be selected.

In another aspect, the ability to mix structured and unstructured data sources allows both (2) and (3) to be found, and similarly for (4) and (5). If indeed all five nuggets are present, missing one or two could be tolerated. But if only one or two are present, the value of an innovative deep miner that can find all five becomes apparent.

Terminology

The usage and meaning of all quoted terms in this section applies throughout this disclosure unless clearly indicated otherwise or repugnant to the context. The terminology below extends to related word forms.

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). Many modern applications can support multiple clients concurrently, and each client can be isolated from other clients, so that each client perceives having its own copy of the application. These actual or perceived copies of the application are dubbed "application instances." The term application instance extends to an application having a single instance.

"Authorization" refers to a permission granted to a client or user to have a given level of access to a given resource such as a data source, or to an act of configuring such permission. A "certificate" is a document storing one or more authorizations.

As a noun, a "cache" is a data repository storing copies of data items, such as results of database queries, or associated items, such as hierarchy paths, ranks, encompassing entities, the database query, the client query, a search key, or a search range. As a verb, "cache" refers to the act of storing any such data items in the repository. A cache can be "updated" by adding, modifying, or deleting cached data. Cached data items can subsequently be "retrieved" from the cache.

A "client" is a hardware or software computing entity that uses a resource provided by another hardware or software computing entity dubbed a "server." Some clients can operate interactively with a user, providing prompts, information, or output to the user, or receiving input from the user; however, this is not a requirement. Other clients can operate in an unattended or head-less mode. A "user" is a person.

A "column" is a collection of like fields, that is, fields playing a common role in multiple data records. While a column can be visualized intuitively in the context of database tables, the term is not so limited and can also be applied to like fields in unstructured data. A table (discussed further below) has at least two columns, and therefore contains both like fields (in one column) and unlike fields (across multiple columns). A table is not a column.

A "computing environment" (or simply "environment") refers to a combination of hardware (e.g. processors, memory, storage, network interface) and software (e.g. operating system, utilities) on which a given software application can be run. Some environments of interest herein include a cloud environment, a database environment, a customer environment, or a host environment. These labels are not mutually exclusive. Clients and stand-alone deep miners are also implemented as computing environments.

The unqualified term "data" refers to any digital representation of information.

"Data format" refers to a language or syntax in which data is stored, maintained, or transmitted. Non-limiting examples of data formats can include: text-based formats such as CSV (comma separated values), JSON (JavaScript Object Notation), XML (extensible Markup Language); specific binary or text specifications (including key-value pairs) associated with various databases, unstructured data sources, or file systems; proprietary binary or text-based specifications; or extensions or variations derived from or built on top of one or more of these. Examples of the disclosed technologies use a "common intermediate format" to maintain data regardless of the format in which the data is received or is to be transmitted. That is, data items received in another format can be translated into the common intermediate format for storage or analysis within an innovative deep miner. The common intermediate format can be a text-based format, and can be applied to one or more of: client queries, column identifiers, hierarchy paths, database queries, results, ranking scores, cache data, cache metadata, or responses.

Distinct from formatting is "data organization" which can refer how data is arranged, e.g. in a query response. That is, specifying a format can still leave flexibility in how data within the response is arranged. For example, a client may require columns to be presented in a particular order, or may provide a template so that response data can be directly ingested into a downstream application. Example deep miners can organize data as part of formulating a response, e.g. according to a specified or predetermined template.

A "data source" is a collection of data maintained on computer-readable media and accessible by execution of instructions at one or more processors. A data source can be unstructured or structured, the latter dubbed a database. An "unstructured data source" contains data in forms not amenable to regular organization. Two well-known implementations of unstructured data sources are HADOOP® and MONGODB®. Non-limiting examples of unstructured data sources include object stores, document stores, and collections. As used herein, the term database excludes an unstructured data source. An unstructured data source can contain records each having one or more fields, however the records of an unstructured data source may not be amenable to fixed organization of a table. Rather, a collection of records is generically dubbed a "data pool." An unstructured data source can have one or more data pools. Records in a data pool can share common fields (e.g. author, size, datatype) and an aggregation of like fields is dubbed a column, in analogy to columns in a database table, even though there may be no such table in the unstructured data source. A facility of an unstructured data source that provides organization information is dubbed a "map." and is a counterpart to the schema, dictionaries, and descriptions of a database. That is, the map can provide definition, description, and relationships between organizational entities within the unstructured data source. Whereas the schema, dictionaries, and descriptions can be regarded as data objects, a map can incorporate data objects or methods, in any combination. To illustrate, MONGODB® offers a method "db.inventory.find ({ })" to obtain all documents in a collection, with many variants for narrower data retrieval.

A "database" is a structured collection of data maintained on computer-readable media and accessible by execution of instructions at one or more processors. Databases can be relational (such as SAP HANA®), in-memory or on disk, hierarchical or non-hierarchical, or any other type of database. Some databases of interest in this disclosure are organized as "tables," each table having multiple records and each record being a collection of fields having respective values. The fields of two records can be the same, while the corresponding values can be the same or can vary between records. A record is denoted a "row" of the table and a column is a collection of like fields, regardless of the physical organization of the table. The organization of a database is contained in its "schema" which can be regarded as a document or data structure. Additional information about organizational units within the database, such as tables or columns, can be variously found in dictionaries and descriptions.

A "dictionary" is a document or data structure that specifies attributes of organizational entities within a database. A "table dictionary" defines the tables of the database, and can itself be a table. Each row or record of a table dictionary corresponds to one table within the database. Each table record can have respective fields for attributes such as an identifier, a name, storage class, dimensions of each table, access restrictions, or associated schemas. A table record can list local keys, local and foreign keys, or all columns of the instant table. A "column dictionary" defines the columns of one or more tables, and can itself be a table. Each row or record of the column dictionary can correspond to one table within the database. Each column record can have respective fields for attributes such as an identifier, a name, a data type, a size, and a flag indicating whether the column is a local key, a foreign key, or neither. In varying examples, dictionaries can contain descriptions of their respective organizational entities but this is not a requirement, and descriptions can be maintained in separate documents.

An organizational unit (commonly a column) within a data source is said to be "directly identified" if it is evaluated and selected without regard to which encompassing entity is part of. Some conventional tools select a table as having relevance to a given client query and then choose a column within that table for execution of a database query. Because the table is evaluated first, as a condition for selecting the column, the chosen column is not directly identified. In contrast, examples of the disclosed technologies collect all columns from the database tables, evaluate the columns, and thereby select relevant columns. While the tables can be used as a navigational aid to reach the various columns, the tables are not evaluated for relevance to the client query, and the selected columns are said to be directly identified.

In a hierarchical data source, an "encompassing entity" for a data item is an organizational unit at a higher level of the hierarchy than the instant data item, which contains at least part of the data item. Given a search result in the form of a field or record which matches a database query, its encompassing entities include the column (applicable to both structured and unstructured data sources), and table or data pool (applicable to structured or unstructured data sources, respectively). In some instances, a single column can be distributed among multiple tables or multiple data pools, in which case any one (or any combination) of those tables or data pools can be regarded as an encompassing entity. That is, the encompassing entity need not contain the entirety of the encompassed entity.

A "field" is a member of a data record having a particular role. A field can have a value, or can be undefined.

"Hierarchical" refers to a multi-level form of organization, in which entities at lower levels are part of, or subordinate to, one or more entities at higher levels. Often, hierarchies have a single apex or root entity at the top of the hierarchy. Some data sources described herein are hierarchical. A hierarchy can be a tree, but need not be a tree. As a counterexample, a given database column can be part of multiple tables, which in turn can be organized within same or different schemas, ultimately within one database (which is the apex entity).

A "hierarchy path" is a path that uniquely defines a position of a given entity within a data source. In varying examples, hierarchy path can specify an encompassing entity immediately above the given entity, or can pinpoint the given entity itself. To illustrate, a given field of a data record can be traced upward, successively, to a column, a table, a schema, and a database. An aggregation of these identifiers, which can be denoted as [Database_ID].[Schema_ID].[Table_ID].[Column_ID] can completely and unambiguously specify the location within which the given field is located. In some examples, the Column_ID can be omitted from the hierarchy path of a data record while, in other examples, the Column_ID can be retained to indicate which column was being searched to find the instant data record. Some examples of the disclosed technology omit a local key from the hierarchy path, while other examples can include the record key, e.g. an identifier of a given row ("Row_ID"). Thus [Database_ID].[Schema_ID].[Table_ID].[Record_key] can also be a valid hierarchy path.

"Host," as a noun, refers to a computing environment within which a software application can run. As a verb, "host" refers to providing such a computing environment for the software application.

An "increment" refers to a change in a data source. Non-limiting examples of an increment include: addition, deletion, or modification of an organizational unit (e.g. table, pool, or column) within the data source; addition, deletion, or modification of one or more records within the data source. The value of incremental search is that cached results from an earlier search can be reused for unchanged data within the data source, and a new search can be run on just the increment, leading to an often significant saving in usage of computing resources. Some innovative deep miners use incremental search to improve efficiency and latency.

"Intelligence" refers to any of several features that can aid in obtaining better results (as determined by relevance scores or ranks), or obtaining such results with less resource utilization. Examples of the former include the use of relevance scores to select columns to query, or ranking of results to formulate a response to the client query. Examples of the latter include caching, because incremental database queries can often reduce computational burden by an order of magnitude or more; or logging histories of queries to aid with selection of relevant columns for future queries.

A "natural language" is a form of encoded communication among humans that has evolved through spoken or written usage over time. Thus, natural languages are distinguished from computer programming languages, constructed languages such as Esperanto, codes such a Morse code, or machine-to-machine communication codes such as used for telephony, data communication, or wireless communication. Arabic, Bengali, Chinese (e.g., Mandarin), and English are just a few examples of natural languages. Some innovative deep miners can incorporate or be coupled to a natural 2 processing engine to handle natural language client queries and improve accessibility of the deep miner.

A "query" is request for information, such as information contained within a database environment. In the context of disclosed deep miners, queries are distinguished as "client queries," which are the queries received by the deep miner from a client, and "database queries," which are the queries issued by the deep miner to a data source. Although unstructured data sources are expressly considered not to be databases herein, for convenience of description the term "database queries" is equally applicable to queries issued to structured or unstructured data sources. A client query can be presented as a natural language query, in a database query language such as ABAP or SQL, or by selection (of e.g. menu items) on a graphical user interface. Both client queries and database queries elicit "responses," which contain information addressing the queries. Other associated terms such as search attribute, search key, search result, search range, and search universe are discussed further below.

As a verb, "rank" refers to assigning respective scores to like items (commonly search results) allowing an order to be defined among the items. Ranking does not require that the ranked items be rearranged. As a noun, "rank" refers to the position of a given item after ordering the items by score. "High rank" is better than "low rank," meaning that a highly ranked item can be considered more valuable than a lower ranked item. As a matter of convention, the highest ranked item can be assigned rank number 1. However, there is no implication as to whether higher rank is associated with numerically greater or lesser scores. That is, ranks can be directly or inversely related to numerical scores. Scores for ranking columns or results can be based on their relevance scores, described further herein. Additionally, a column's score can be adjusted after its database query completes, e.g. based on the number of results (records) obtained, or on a performance metric. To illustrate, a column finding 30 matching records can be considered more valuable than another column finding only two matching records. A column taking seven seconds to return 10 results can be ranked higher than another column taking 2 minutes to return 10 results.

In the context of queries and responses, the terms "receive" and "transmit" refer to communication over a network, which can be in the form of a message. The communication can be electromagnetic, e.g. over wired, wireless, or optical media, but this is not a requirement.

A "record" is a collection of multiple data fields having respective values, and the term is used in the context of both structured and unstructured data sources. In an unstructured data source, a record can additionally contain an opaque data object from which field values have not been extracted. In the context of a database, a record can be a row of a database table, with the fields of the record containing respective values for the columns of the table.

"Relevance" refers to a property of a column or result that indicates its likely value to the client query. For a column, relevance can be determined by calculating a score (as a matter of convention, higher is better) for that column, based on a number of factors. The following are non-limiting examples of such factors. First, lexical match to a search attribute, either in column label, column description, or a list of allowed categorical values can be used as a factor for relevance—with weights for the location of the match. To illustrate for a search attribute "Equipment," a column label "Equip" could get a higher score than "Equ", and a column label "Equip" could generate a higher score than "Equip" found within a description of the column. As a second example, semantic match to search attributes, e.g. using a synonym dictionary or a named entities list, can be used as a factor. To illustrate, a column label "Trouble report" could get a high score as semantically matching a search attribute "Problem." A third factor example could be lexical or semantic match of allowed or most frequent column values to a search attribute. To illustrate for a search attribute "Suspension," a Subsystem column having "suspension" as an allowed value could get a higher score than an Account status column having "suspended" as an allowed value. A fourth factor example could be relevance scores of other columns in an encompassing entity (e.g. table or data pool) for other search attributes. To illustrate, a "Problem" column in a table that also has the "Subsystem" column could get a boost to relevance, while a "Problem" column in a table of physical plant service logs may not. A fifth factor example could be a history showing that the instant column has produced highly ranked results for previous client queries or previous client queries overlapping the present query. To illustrate, an example deep miner could have a log or cache indicating that a given column has been among top five columns (based on results obtained) 50 times for all client queries, or 12 times for overlapping client queries, and the given column could get a boost to its relevance score relative to another column that had a less successful history. Relevance for a result (e.g. a record found by a database query) can be calculated based on closeness of match to one or more search ranges in respective columns, with additional weight optionally given to (a) the relevance score of the column whose database query found the record, or (b) the number of result records returned for the instant database query. Result relevance can also be influenced by a domain from which the results are found. That is, enterprise data source environments can be divided into multiple domains, e.g. corresponding to divisions within the enterprise, or domains for affiliated partners. A hierarchy path can provide domain information for any result, and certain domains can be assigned higher relevance scores based on a predetermined profile of an instant client.

A "request" is a message to which a substantive response ("response") is expected, that is, a response beyond an acknowledgment; or a message for which a recipient of the message is expected to take a specified action. In contrast, a "notification" or a "report" need not receive a substantive response, nor result in any specific action.

"Search" refers to an operation or group of operations that produce information relevant to a query.

A database query can contain information guiding where to search and what to search for. A "search key" is an indication of where to search, and can be a column. To illustrate in the context of finding an automobile, the search key can be a column labeled "VIN". A "search range" is an indication of what to search for, which can a single value, a range of values, a pattern, or another specifier of desired value(s) of a corresponding parameter. In the context of finding the automobile, the search range can be the value 1FTYR10XXYPC06335. With this search key and search range, a database query can return a record having a value 1FTYR10XXYPC06335 in the VIN field. In varying examples, the search range can specify an atomic datatype, such as a number or string or enumerated type; can specify a range of values, such as 10 to 100; can specify a pattern, such as "AB?123*", which is a text string with wildcard characters "?" and "*"; or can specify a relationship, such as "not equal to Null value." A search range can include a qualifier, e.g. indicating whether exact or fuzzy match is desired. Database queries can also be compound queries specifying multiple search keys or multiple search ranges.

A "search attribute" is a parameter defining a search. Search attributes can be extracted from a client query and can be used to derive one or more search keys and corresponding search ranges. Conceptually, a client query can be transformed into a database query as follows: client query→search attributes→search key and search range→database query. In the illustration where a query indicates a suspension problem on a vehicle having a particular VIN, possible search attributes include: "problem" and "VIN" which indicate parameters of interest, and "suspension" and "1FTYR10XXYPC06335" indicate desired values of those parameters. A "key attribute" can be used by an innovative deep miner to determine a search key (where to search). The desired values are denoted as "search range" to reflect that what-to-search-for need not be a single value, and a "range attribute" can be used to determine a search range. A search attribute can be obtained from a structured client query by parsing the query. A natural language processing engine can be used to extract search attributes from a natural language client query. A synonym directory or service can be used to expand a single parameter search attribute into a set of semantically related search attributes, to extend the reach for an instant search and retrieve a larger number of relevant results. While search attributes are often extracted from queries, this is not a requirement, as an innovative deep miner can generate search attributes automatically, e.g.

based on column evaluation, based on learning a map of an unstructured data source, or based on results of previous queries.

A "search result" or "query response" refers to information conveyed in response to a query. The result can be a single data item, or a set of zero or more data items. That is, an empty set with zero members can be a valid result. In disclosed examples, an innovative deep miner can receive a search result from a data source in response to a database query issued thereto, and can transmit a query response to a client in response to a client query received therefrom. A search result or query response can include data records that directly satisfy the originating query, and can also include auxiliary data in the form of e.g., hierarchy paths, scores or ranks, or domain information. In some instances, the response can include only auxiliary data, without any specific data records. To illustrate, the response to a client query could merely indicate that table TI in database D1, and column C2 in unstructured data source U2 are the best places to search for a given client query, without providing any data records from table TI or column C2.

A "search universe" is a group of one or more data sources available to be queried.

"Software" refers to computer-executable programs or instructions and associated data structures. Software can be in active or quiescent states. In an active state, software can be loaded into memory, or can be undergoing execution by one or more processors. In a quiescent state, software can be stored on computer-readable media, awaiting transmission or execution. Software can be organized as one or more "modules." A module can contain one or more executable functions and associated data directed to a common task or group of related tasks. Software can be offered as a service, which can be implemented by one or more modules.

As applied to data objects, the term "store" refers to writing a value of the data object to a location on a storage medium, and the term "retrieve" refers to reading a value of the data object from a location on a storage medium. Non-limiting examples of storage media can include a hard disk or semiconductor memory. Among other uses, data objects can be stored to, or retrieved from, data sources and caches.

A "table" is a two-dimensional array organized into rows (e.g. records) and columns (e.g. fields). Commonly, a row can be a record pertaining to an instance of some class of objects represented in the table, and a column can pertain to a particular property (field) of those objects. To illustrate, a field at the k-th column of the m-th row can store a value of the k-th property for the m-th object. In examples, a table can be a row store table accessed through an associated index structure or a column store table. In a relational database, certain columns can be keys. A "local key" refers to a column whose value uniquely specifies one record within the table. A "foreign key" refers to a column that is a local key of another table, allowing relations to be formed between the tables.

The term "tracing" refers to an operation of successively identifying entities, level by level, in a hierarchical data source. Tracing is said to be upward going from e.g. a column to a data source (the apex of the hierarchy), and is said to be downward going from the apex of the hierarchy (the data source) to e.g. a column or record.

Conventional Exploration Method

FIG. 1 is a flowchart depicting a conventional exploration method from a user perspective. At process block 110, the user can launch a search interface. At block 120, the user can enter an exploratory search string in the search interface. At block 130, the user can view search results in the search interface. At decision block 140, the user can determine whether the search results are satisfactory. If the search results are not satisfactory, the method can follow the N branch from block 140 back to block 120, for the user to attempt another exploratory search string. Alternatively, if the search results are determined to be satisfactory at block 140, then the method can follow the Y branch to block 150, where the user can use the results, e.g. for analysis or presentation. The exploratory method is highly dependent on user skill, and can miss good data that is available. Moreover, even if good data is ultimately found, many iterations of the illustrated loop may be required. In environments where each search iteration scans millions, or even billions, of data records, exploration can consume a lot of computing resources. In practice, explorations are often terminated because of excessive resource utilization, without optimal or even satisfactory results being found.

Example Structured Database

Figure 2:
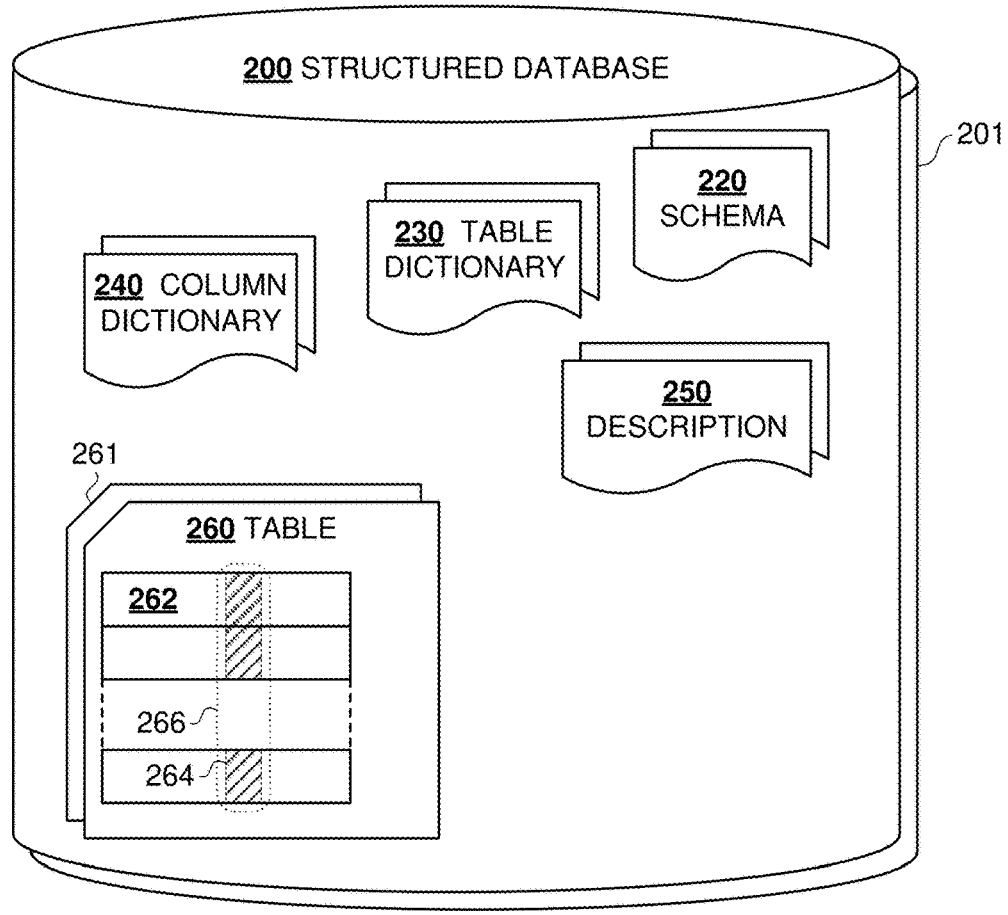
FIG. 2 is a diagram of a structured database, illustrating features applicable to examples of the disclosed technologies.

FIG. 2 is a diagram of a structured database 200, illustrating features applicable to examples of the disclosed technologies. Shown in FIG. 2 are tables 260 and exemplary metadata in the form of schemas 220, dictionaries 230, 240, and descriptions 250. Although a single structured database 200 is described in detail below, a search universe can incorporate multiple structured databases 200-201 as illustrated, each organized according to similar principles, although the details can vary.

Schema 220 can provide an overall description of the organization of database 200. In examples, schema 220 can list the tables in database 200, can indicate at least local key columns and foreign key columns included in each table, and can indicate relationships between the tables, e.g. based on the local and foreign keys. Although some databases have a single schema 220, this is not a requirement and a single database can have multiple schemas as shown. As an example, users of a database may have some shared data, but different applications. Different schemas within a single database can allow the users to share data among their respective applications, without the overhead of maintaining consistency between copies of the shared data. As another example, users can have different privileges, and a restricted schema can be used to keep sensitive data hidden from unauthorized users.

Table dictionary 230 can contain one record for each table 260-261 in database 200, each record providing fields describing the respective table. In examples, these fields can indicate an identifier, a name, storage class, dimensions of each table, access restrictions, or associated schemas 220. Table dictionary 230 can itself be organized as a table. Although some databases 200 can have a single table dictionary 230, other databases can have multiple table dictionaries 230, e.g. one for each schema 220.

Column dictionary 240 can contain one record for each column of table 260, each record providing fields describing the respective column. In examples, these fields can indicate an identifier, a name, a data type, a size, and a flag indicating whether the column is a local key of the instant table 260, a foreign key (e.g. a key of another table 261), or neither. For enumerated data types, the column dictionary can specify a list of allowed values. Column dictionary 240 can itself be organized as a table. While some databases can have separate column dictionaries 240 for each table 260-261, this is not a requirement, and a common column dictionary 240 can include entries for all tables of database 200. An additional field for "table" can be used to distinguish records for table 260's columns from those of table 261.

Description 250 can contain plain text description of tables, columns, relationships, administrative information, or any other descriptive material relevant to database 200.

The above description and organization of metadata 220, 230, 240, 250 is merely exemplary. Numerous variations and extensions can be utilized consistent with the disclosed technologies. For example, some table dictionary information can be embedded within schema 220, or descriptions can be embedded with table dictionaries 230 and column dictionaries 240 as appropriate. Moreover, FIG. 2 shows all metadata 220, 230, 240, 250 within database 200 for clarity of illustration. However, in practice these metadata can be distributed inside and outside the deployed database 200. For example, schema 220 can be within database 200, while dictionaries 230, 240 and description 250 can be stored outside or alongside database 200. External metadata can have more flexibility for organization, accessibility, or storage. In further examples, database 200 can be associated with additional metadata, e.g. pertaining to security, administration, or access methods. Still further, additional metadata can enhance the functionality of database 200. For example, a list of named entities can facilitate the use of natural language queries. Lists of most frequent values for various columns can facilitate determinations of relevance.

Finally, tables 260-261 contain the user data of database 200. Each table can be organized in rows and columns, with each row 262 providing one record of table 260, and containing a number of fields 264 having respective values. In the horizontal direction of FIG. 2, any given record 262 is defined by the values of its respective fields 264. In the vertical direction, column 266 is formed of like fields 264.

Example Unstructured Data Source

Figure 3:
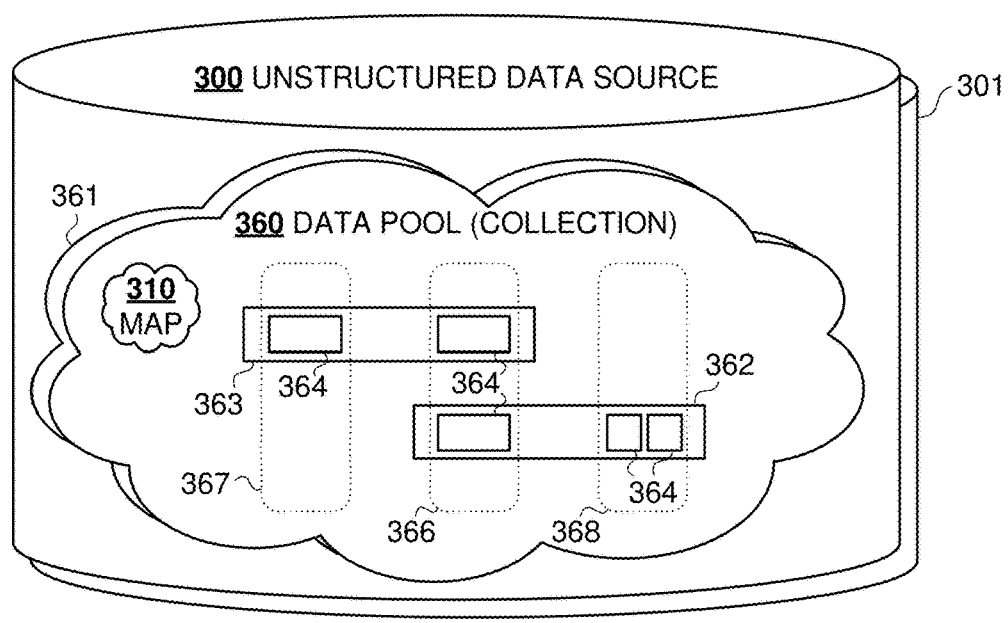
FIG. 3 is a diagram of an unstructured data source, illustrating features applicable to examples of the disclosed technologies.

FIG. 3 is a diagram 300 of an unstructured data source, illustrating features applicable to examples of the disclosed technologies. Because unstructured data sources span a wide gamut of organizations (e.g. object stores, document stores, collections) and implementations (e.g. HADOOP®, MONGODB®), the description of FIG. 3 relies on generic terminology and concepts. For clarity of illustration, the generic terminology (e.g. data pool, record) is supplemented with terminology specific to an illustrative document collection having individual data items in the form of key-value pairs. Shown in FIG. 3 are data pools (collections) 360-361. As illustrated, each data pool (collection) can contain its own map 310, but this is not a requirement. In other examples, map 310 can be stored alongside data pools 360-361 in a similar manner as schema 220 is stored alongside tables 260-261. A single unstructured data source 300 is described below, however a search universe can incorporate multiple unstructured data sources 300-301 as illustrated, each organized according to similar principles, although the details can vary.

Data pool (collection) 360 contains user data in the form of records (documents) 362-363, each comprising one or more fields 364. Records 362-363 can variously be: primary data objects in the form of documents, media objects, data structures, in any combination, with same, similar, or diverse organization; chunks of primary data objects; or derivative data objects extracted from primary data objects, in any combination. Regardless of form, each record (document) 362-363 contains information which can be regarded as values of respective fields (keys) 364. As shown in FIG. 3, records (documents) 362-363 can have different data fields 364. Fields 364 are shown organized as columns 366-368, each column having like fields (e.g. key value pairs with a common key). As shown, both records (documents) 362-363 have data items (key-value pairs) in column 366; only record (document) 363 has a data item 364 in column 367; and record 362 has two data items 364 in column 368 while record 363 has none. The varying composition of records (documents) 362-363 is unsuitable for a tabular organization of FIG. 2. While some unstructured data sources can be organized as a single pool (collection) 360, this is not a requirement and, in other examples, multiple data pools (collections) 360-361 can be implemented as shown. For example, primary and derivative data objects can be stored in different pools, supported by different access methods.

As an illustration, record (document) 363 can be a user record with key-value pairs {"Name": "James", "Contact": "Room 134"} in columns 366-367 respectively; and record (document) 362 can be another user record with key-value pairs {"Name": "Michael", "Contact": "Phone 9-0360", "Contact": "Michael@abc.com"} in columns 366 and 368. In examples, collections 360-361 can be specified as JSON, CSV. XML, or other text or binary formats.

Map 310 can provide definition, organization, relationships, and/or access methods to retrieve records 362-363, values of fields 364, or organizational information of data source 300. Thus map 310 provides functionality similar to schema 220, dictionaries 230-240, and descriptions 250 in database 200. Because of the inherent flexibility and variability of unstructured data sources, map 310 can also provide access support that is unique to a particular data source deployment 300. In some examples, map 310 can provide only access methods, without revealing any underlying structure of data pools 360-361 or contents therein.

Examples of the disclosed technologies can learn map 310 in order to identify relevant columns and thereafter run database queries against these columns. To illustrate, in a MONGODB® deployment, tools such as Atlas and Variety can provide facilities for learning map 310. In a HADOOP® deployment, tools such as HCatalog, Hive, Zookeeper, and HBase can provide comparable functions.

First Example Method

Figure 4:
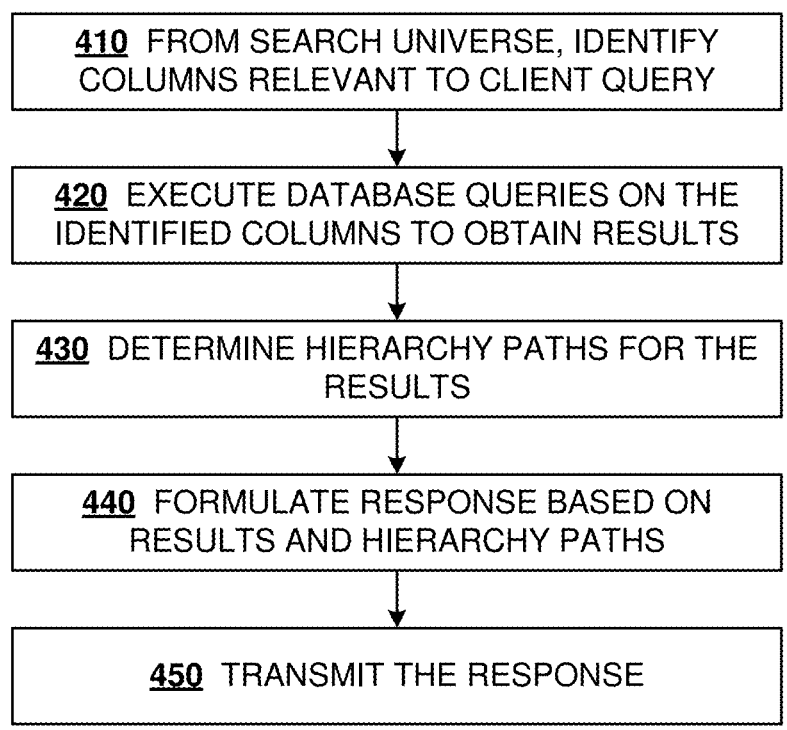
FIG. 4 is a flowchart of a first example method for responding to a client query, according to the disclosed technologies.

FIG. 4 is a flowchart 400 of a first example method for responding to a client query, according to the disclosed technologies. In examples of this method, a determination is made where to search to fulfill the client query, the search is made accordingly, and a response is formulated and transmitted, based on the search results and hierarchy paths uniquely identifying where the results were obtained.

At process block 410, one or more columns relevant to the client query are directly identified from the search universe. The columns can be identified based on search attributes extracted from the client query. To illustrate, for a client query regarding a suspension problem on a particular automobile, columns related to problems (e.g. problem description), suspension (e.g. subassembly), or the vehicle (vehicle identification number ("VIN"), vehicle model), can all provide relevant information.

The client query can be originated by a client and, as described herein, the search universe can include one or more data sources which the client is authorized to access. For a structured data source, such as a relational database, the column can be part of a table, which in turn can be organized under a database schema. As described herein, the column can be identified directly by evaluating e.g. the name or description of the column, without making any assessment as to relevance of the table, schema, or any other encompassing entity. Conceptually this can be understood as collecting identifiers of all available columns into a sea of columns, and evaluating each column without regard to its parent table, schema, or other encompassing entity. In examples, the sea of columns can include identifiers or descriptions of the columns. In examples, the sea of columns can include information such as allowed values for a given column, or the most commonly occurring values. (However, the field values of specific records can be excluded.) In practice, the sea of columns need not be physically collected together. Rather, the database organization (e.g. schemas, dictionaries, or tables) can be traversed, and all encountered columns can be evaluated. Similarly, for an unstructured data source, the available columns can have encompassing entities which can be different from database tables and schemas. For example, an unstructured can have a pool of data records or documents, without a table organization, or can employ a flexible schema, or diverse other forms of data organization.

At process block 420, database queries are executed on the identified columns to obtain results for the client query. As discussed herein, a database query can have one or more search keys (e.g. an identified column) and corresponding search ranges (e.g. the value(s) sought in that column). In the illustration, a first database query can search for a value 1FTYR10XXYPC06335 in a VIN column, while a second database query can search for a value "suspension" in a Subassembly column. In examples, more complex database queries can be formed and executed. To illustrate, a Service Record table can have both VIN and Subassembly columns, and a database query can search for records containing both "subassembly" and the specified VIN in the respective columns. Still further, two or more tables can be joined into a view, and a database query can perform a multi-column query on that view. In some examples, a result can be a record that satisfies the database query, but this is not a requirement and, in other examples, the result can be an encompassing entity containing that record and, in further examples, the result can be just part of the record. To illustrate, a search for a range 2010-2015 in a year of manufacture column can return just the result (e.g. 2012) and optionally a key identifier, leaving further examination of the record to a subsequent query. Fuzzy searches (e.g. in a Problem Description column) can be handled similarly.

At process block 430, hierarchy paths can be determined for the results. As described herein, the hierarchy path for a given result can unambiguously and uniquely identify the location of the result. To illustrate, the hierarchy path for a database record can be a string containing information identifying its encompassing table, schema, and database and, optionally, the column on which the database query was performed.

At process block 440, a response can be formulated based at least partly on the results and their hierarchy paths. In some examples, the response can include, for each database query, a list of data records satisfying the database query and an associated hierarchy path. In other examples, the data records can be augmented into entire tables, so that a table containing a hit for an instant database query can be examined for similar records. Records or results are considered "similar" if they have matches in one, two, or more columns. In further examples, the response can apply ranking, of columns or data record results, and the results can be sorted or filtered, according to the ranking, for inclusion in the response.

At process block 450, the response can be transmitted. Commonly, the response can be transmitted back to the client originating the client query, but this is not a requirement. In some examples, the producer of the client query can be different from the consumer of the response. That is, the producer and consumer can be different people, different software applications, or a mix of people and software applications, in any combination. The response can also be multi-cast to multiple destinations. As another illustration, a voluminous set of results can be stored in a repository and a link to the set of results can be returned to the originating client.

Numerous variations or extensions can be implemented within scope of the disclosed technologies. In some examples, the client query can be a natural language query while, in other examples, the client query can be a structured query such an SQL query or a MONGODB® find query. In some examples, the search universe can include a plurality of data sources, or at least one structured database and at least one unstructured data source, while in other examples the search universe can be a single data source, either structured or unstructured.

For a structured database having one or more dictionaries, the available columns can be found from corresponding dictionaries, and relevant columns identified therefrom. To illustrate, a Service Record table can have a dictionary exposing its columns as: Record Number (local key), Date Created, VIN, Model, Model Year, Problem Description, Subassembly, Status, Service Facility, Technician, Date Completed. Of these, VIN and Subassembly columns can be identified as relevant to the instant client query.

For an unstructured data source, the directly identifying can be preceded by learning a map of the data source. In varying examples, the map can be in the form of data (e.g. one or more data structures) or method(s) (e.g. an API). As described herein, the map can be learned bottom-up or top-down. To illustrate the former approach, a MONGODB® query db.collection.find ("ALEX") can be used to search for all key-value pairs having value equal to "ALEX", and these can be traced upward to identify parent record (document) and data pool (collection). In a HADOOP® environment, various tools such as HCatalog JAVA® API and Hive APIs are similarly available. Then, columns within the unstructured data source can be identified using the map. Among these, relevant columns can be identified based on similar evaluation as for the structured database.

In some examples, block 410 can be preceded by receiving the client query from an originating client. Reception can be direct or indirect, examples of the latter including reception through a firewall, gateway, or load balancer. In some examples, the originating client may have preexisting certificates. The search universe can be determined based on certificates associated with the originating client, each certificate storing authorizations of the originating client for respective one or more data sources. In other examples, no preexisting certificates may exist, or the originating client may wish to add or modify existing authorizations. In such cases, the originating client can provide new or updated authorizations, which can be captured in certificates and stored in a repository for future use.

In some examples, a given result is obtained from a database query on a given identified column, and the hierarchy path can be determined by tracing upward from the column to the parent data source. For a structured database, this can involve aggregating (e.g. concatenating test strings or binary coded identifiers) for the given column, its parent table, schema, and the database. For an unstructured data source, the chain of the hierarchy path can also be traced upward from the column to the data source, although the intermediary encompassing entities can vary.

In some examples, a plurality of identified columns are assigned ranks according to a predetermined criterion and the formulating is based on the ranks. To illustrate, ranks can be based on a similarity of match between the column identifier or description and a search attribute. For example, if the search attribute is "VIN", then a column label "VIN" could get a maximum score e.g. 100, while a column whose label is "VIN #" could get a score 95, a column whose label is "vehicle identifier" could get a score of 80, and a column whose label is not relevant to VIN but whose description including "vehicle identification" could get a score of 50. That is, the similarity of match can be determined lexically (e.g. VIN vs. VIN #) or semantically (e.g. VIN vs. vehicle identifier). Ranks can be assigned according to the score. As illustrated, the columns could be ranked according to their similarity score, thus 100>95>80>50. In further examples, columns can be ranked according to the relevance of an encompassing entity. In the illustrated example, a column from a Service Record table can be ranked higher than a column from a Shipping Record table.

In other examples, columns can be ranked after the database searches are executed, e.g. based on the number of results, on quality of results, on complexity of the database query (more complex queries often resulting in hits with greater relevance). In further examples, results can be ranked. To illustrate, among multiple data records resulting from a single query or distinct database queries, a data record associated with a more recent date can be assigned a higher rank than an older record, or data records can be ranked according to their relevance to search attributes other than those in an instant database query. To illustrate, a VIN search resulting in a record associated with a suspension problem can rank higher than a record associated with an oil change. A record having an exact match to a fuzzy search can rank higher than a record having an approximate match.

The formulated response can be dependent on the ranking of columns or results. Results can be sorted according to rank. A higher ranking column or result can be presented earlier in the response (e.g. near the beginning or top of the response). Results can be filtered according to rank. To illustrate, only a predetermined number or amount (e.g. top 10, top 100, first 20 megabytes, or similar) of the results can be included in the response. Alternatively or additionally, only results or columns whose ranks or scores are above a threshold can be included in a response. In the VIN illustration above, a threshold score of 75 could exclude the last column whose score is only 50. Furthermore, filtering of columns can be performed after the database queries have been executed, because higher ranking columns can, in some instances, fail to produce an adequate number or quality of results.

Still further, the formulated response can include encompassing entities for highest ranking columns or results. To illustrate, a column returning 20 results can be a highest ranking column when no other column returns more than five results. Then, an entire table containing this column can be incorporated into the formulated response. The formulating can include translating this encompassing entity (e.g. a table or other data structure) into a format specified by the originating client.

In some examples, the first method can be extended with additional database queries. To illustrate, a hit for VIN in a Manufacturing data source can lead to records identifying the manufacturing plant and the manufacturing date, and hit for the suspension subassembly in a Materials database can lead to records identifying parts used in the suspension. Either one of these associated fields, or both together, can be used as second search attributes, from which additional columns are identified, and a second round of database queries are conducted on the additional columns. To illustrate, the second round of database queries can generate additional results, e.g. identifying vehicles having similar build parts and/or similar time and place of manufacture, which can be used by a client for further analysis. The response can also include the additional results and their respective hierarchy paths.

In further examples, the first method can be integrated with a caching capability. To illustrate, a client query resulting in a search for "suspension" or for a particular model can occur multiple times. To avoid the inefficiency and resource wastage of repeated execution, a cache can be maintained. The cache can be updated with one or more of: the client query, the identified columns, the database queries, the results, the hierarchy paths, or ranks associated with the columns or results, in any combination. In the suspension illustration, a second similar query can reuse cached items such as: the identified columns, the database queries, or the results. Further actions to handle the second query can be limited to increments to the search universe. To illustrate, the cached columns for the first client query can be reused, and further evaluation of columns can be restricted to columns newly added since the first query, or whose labels or descriptions have changed. On the cached columns, the database queries from the first client query can be reused, but executed only on portions (data records) of an encompassing entity that have been newly added or modified since the first query. Similarly, cached results and cached hierarchy paths can also be reused for the second query. A cache can also maintain logs of queries, providing an indication of frequently occurring client queries, search attributes, or columns providing high ranking results.

In some examples, the second query can be identical to the first query (e.g. if the same vehicle comes back a year later with the same or similar suspension problem), but this is not a requirement. Cached data can be reused when the second query has overlap with the first query. Overlap can occur when the first and second queries have a common search attribute or search key. To illustrate, columns and results relevant to the VIN can be reused when the same vehicle returns with a different problem, or columns and results relevant to the suspension can be reused when a vehicle with different VIN (even a different model) has a suspension problem. Thus, the method can be extended by receiving a second client query overlapping the first client query. Considering that a given database query, among the database queries for the first client query, targeted a given column of a given data source in the search universe, the given database query can be executed again in response to the second client query, albeit on an increment of the given data source rather than the entire given data source, to obtain incremental results. In some instances, the hierarchy path for the given column can be retrieved from cache, and the extended method can retrieve cached results from the first client query and the hierarchy path from the cache. A second response can be formulated based at least upon the incremental results, the retrieved results, and the retrieved hierarchy path.

In additional examples, the search universe can include multiple data sources which can have distinct formats among themselves. Then the results can be cached in a common intermediate format. The common intermediate format can be unsupported by at least once of the data sources in the search universe. The common intermediate format can be applied to one or more of: client queries, search attributes, column identifiers, database queries, results (e.g. identifiers of records matching an instance database search, or the entire records), identifiers of tables or other encompassing entities (or the entire encompassing entity), or hierarchy paths, in any combination. That is, the common intermediate format is not limited to results. In some examples, the common intermediate format can be a text-based format such as JSON. A response or part thereof can be translated from the common intermediate format to a client's preferred format.

In some examples, the database queries can be planned according to constraints. Inasmuch as execution of database queries consumes resources in the form of processor usage, storage usage, and network bandwidth, some query plans can be more efficient than others. To illustrate, a plan optimizer can determine that a given query may require scanning a million records, which may require multiple query iterations. The data source can enforce a batch size of a thousand records per iteration, in which case a thousand iterations will be required. A planning tool can optimize serial-parallel distribution of these iterations among multiple processors and threads. One thread sequentially issuing the thousand iterations can exceed a predetermined time to completion, while a thousand threads on one processor could invoke unacceptable contention overhead between the threads, ultimately leading to an even longer completion time. Still further, running one thread each on a thousand processors may exceed a number (say, 20) of available processors. After evaluation of alternatives, a plan optimizer can determine an optimum explanation of the database query according to these and other constraints. Thus, non-limiting examples of constraints can include completion time, processor overhead, a number of threads, or a number of processors. In the present illustration, ten threads each on ten processors, with each thread sequentially issuing ten query iterations can be found to be optimum—meeting a predetermined required completion time, with inter-thread processor contention held below a predetermined limit, and leaving the other ten processors free for other tasks.

Second Example Method

Figure 5:
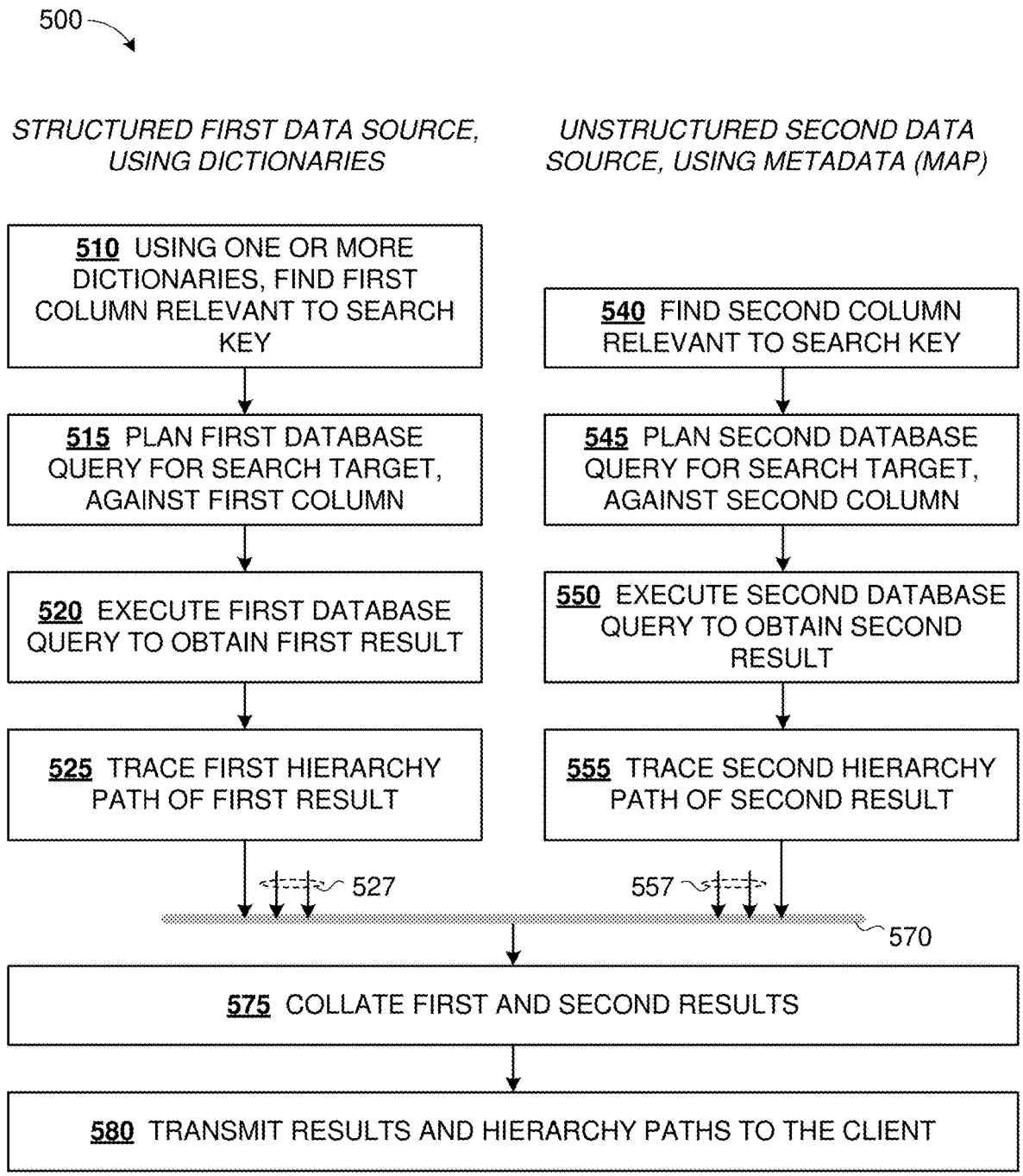
FIG. 5 is a flowchart of a second example method for responding to a client query, according to the disclosed technologies.

FIG. 5 is a flowchart 500 of a second example method for responding to a client query received from a client. In examples of this method, results are obtained from two different data sources, one a structured database and the other an unstructured data source. The results are collated for transmission to the client. Blocks 510-525 pertain to operations on the structured database, while blocks 540-555 pertain to operations on the unstructured data source.

Initially, a client is authorized for access to multiple data sources including at least a structured database and an unstructured data source. The client provides a query which is associated with at least one search key (e.g. "VIN") and a search range (e.g. 1FTYR10XXYPC06335).

At block 510, dictionaries of the structured database are used to find a first column relevant to the search key. As illustrated above, this can be a column labeled "VIN #" in the structured database. At block 515, a first database query can be planned against the first column for the search range (e.g. the specific VIN number). At block 520, the first database query can be executed to obtain a first result. At block 525, a first hierarchy path of the first result can be traced.

Similarly, at block 540, metadata (e.g. map 310) of the unstructured data source are used to find a second column relevant to the search key. As illustrated above, this can be a column in the unstructured data source whose description includes "vehicle identification". At block 545, a second database query can be planned against the second column for the search range (e.g. the specific VIN number). At block 550, the second database query can be executed to obtain a result within the search range. At block 555, a hierarchy path of the second result can be traced.

When first and second results, and their respective hierarchy paths are all available, the method can continue from flowchart join 570 to block 575, where the first and second results can be collated into a response. In additional examples, the instant method can be extended to obtain and collate additional results from additional data sources, as indicated by arrows 527, 557. Finally, at block 580 the response incorporating the results and their respective hierarchy paths can be transmitted to the client.

Numerous variations or extensions can be implemented within scope of the disclosed technologies, including some described here, some described in context of FIG. 4, and some described elsewhere herein.

In some examples, finding the first column at block 510 can be performed directly, bypassing evaluation (for relevance to the search attributes) of any data structures encompassing the first column. In further examples, finding the second column at block 540 can be performed directly, bypassing evaluation (for relevance to the search attributes) of any data structures encompassing the second column. In some examples, the hierarchy path of a result can be an aggregation of the corresponding searched column and the hierarchy path of that column, and the block 525 can be performed directly after block 510, before or concurrent with execution of blocks 515, 520. In other examples, the hierarchy path can be dependent on a join of two tables (or a similar derivation operation on the unstructured data source) and the hierarchy path can be traced any time after the joined view is determined, but still before reaching flowchart join 570.

In additional examples, the instant method can be extended to obtain and collate additional results from additional data sources, as indicated by arrows 527, 557.

Example Deployment Environments

Figure 6:
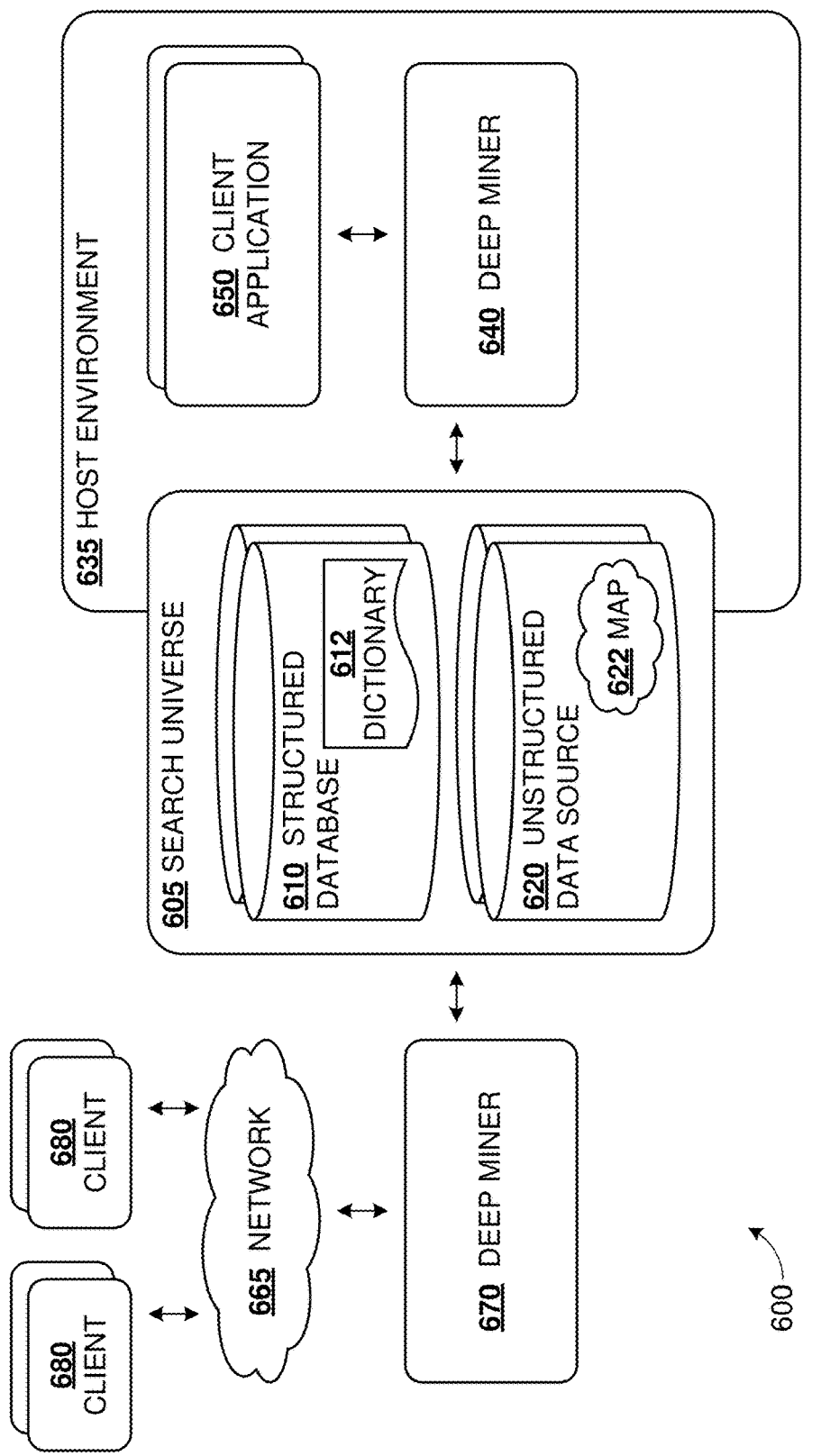
FIG. 6 is a composite diagram illustrating example deployment environments for the disclosed technologies.

FIG. 6 is a composite diagram 600 illustrating example deep miner deployment scenarios. Two miners 640, 670 are shown, each implementing examples of the disclosed technology and operating on search universe 605. Search universe 605 is merely illustrative, and can vary from one client query to the next.

Illustratively, search universe 605 is shown having multiple structured databases 610 and multiple unstructured data sources 620, but this is not a requirement. In other examples, a single database or data source, or any other combination of databases or data sources can be used. Structured database 610 can be similar to database 200 described herein, and can include one or more dictionaries 612. Unstructured data source 620 can be similar to unstructured data source 300 described herein, and can include one or more maps 622.

Starting on the left side of FIG. 6, deep miner 670 operates as a stand-alone service which can be implemented on real or virtual server computers in a datacenter or cloud computing environment. Deep miner 670 can receive client queries from one or more clients 680 over network 665. In examples, deep miner 670 can be hosted in the cloud.

On the right side of FIG. 6, deep miner 640 operates within a host computing environment 635. That is, deep miner 640 can receive client queries from one or more clients 650 (which can be users or software applications, in any combination) that are also within host environment 635, and the functionality of deep miner 640 can be inaccessible from outside the host environment.

Search universe 605 is shown partially overlapping host environment 635 to indicate that deep miner 640 can access a mix of data sources: some within host environment 635 and/or some outside, in any combination, including in a cloud. Similarly, a stand-alone deep miner 670 can access data sources that are co-located or distributed widely, including in some examples behind a gateway of environment 635.

Regardless of deployment environment, deep miners 640, 670 can implement security measures, for examples certificates attesting to authorizations that a respective client 650, 680 may have for data sources in search universe 605.

Third Example Method

Figure 7:
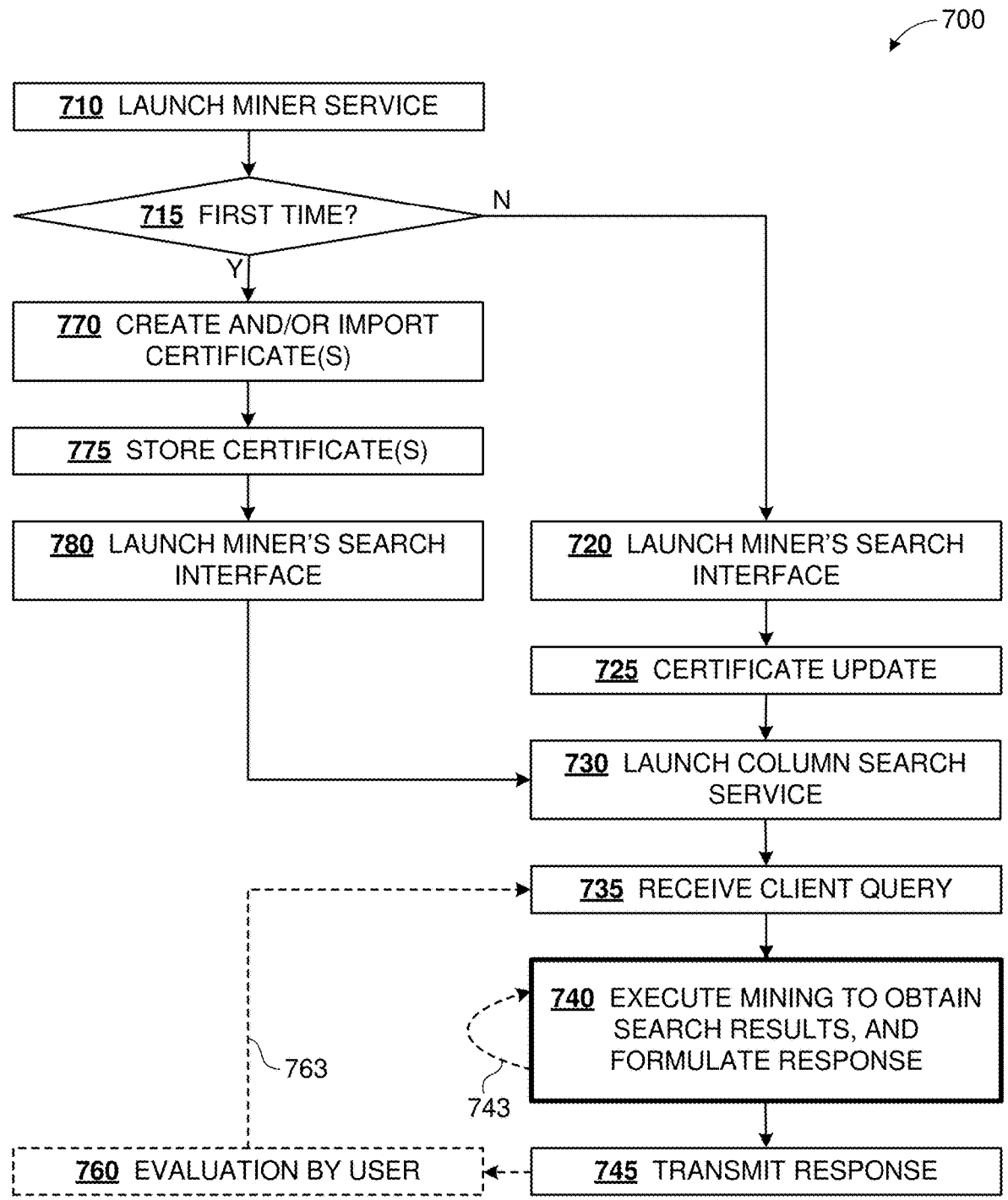
FIG. 7 is a flowchart of a third operational method for examples of the disclosed technologies.

FIG. 7 is a flowchart 700 of a third example method which provides an operational overview of an example deep miner, from a session perspective. This method covers operational phases from launch of a mining service through completion of a search procedure, omitting details of the search operation which are described elsewhere herein. In examples, certain prerequisites for this method can include: deep mining and caching being enabled, and clients having low-level access to their authorized data sources.

Initially, at process block 710, a deep miner (e.g. 640, 670) can be launched as a service. The service can be launched in response to a request or command, received over a connection, from a client acting on behalf of a user. At decision block 715, the miner service can make a determination whether the user, on behalf of whom the service has been launched, is a first-time user of the service.

If the user is determined to be a first-time user, the method can follow the Y branch from block 715 to block 770, where one or more certificates for the user are imported and/or created. A certificate provides an indication that the user is authorized for access to one or more data sources. In examples, the certificate can include credentials for those sources while, in other examples, the deep miner can be trusted by the data sources and need not store the credentials for repeated use. In some examples, the certificate(s) can be created by filling in a template based on the connection over which the user is connected to the deep miner. In other examples, connection information can be exported to the deep miner from the client, and used to create the certificate(s). In further examples, the client can directly export the certificate(s) to the deep miner. Then, at block 775, the certificate(s) can be stored in a certificate repository and, proceeding to block 780, a search interface of the deep miner can be launched over the client's connection. The method proceeds to block 730.

Turning back to decision block 715, if the user is determined to have a pre-existing certificate or be known to the miner, e.g. as a repeat user, then the method can follow the N branch to process block 720 where, similar to block 780, a search interface can be launched. Then, at block 725, the repeat user can optionally update their certificate(s). In some examples, the user can also be provided an opportunity, at block 725, to select or deselect particular data sources for a current query session. The method proceeds to block 730.

At block 730, a column search service can be launched. As described herein, column-driven search can provide more effective discovery of useful search results, with considerable saving in computer resources—as much as an order of magnitude or more. Because a client query has not yet been received, block 730 can be limited to initialization acts.

At block 735, a client query can be received over the client connection. In the automotive illustration, the client query can request information pertaining to a suspension problem encountered on a vehicle identified by its VIN (vehicle identification number). Based on this client query, the deep miner can perform column-driven mining at block 740 to obtain search results. Exemplary details of block 740 are described elsewhere herein.

In some examples, results of the mining search can be used to drive a second iteration of block 740, via optional arrow 743. For example, if the VIN is identified as a particular model vehicle M and the suspension problem is found to be associated with a particular replacement part P, then the second iteration of block 740 can search for service records involving part P and model M. That is, the second iteration can locate records that are related to the client query from block 735, even though neither parameter of the second iteration can be directly derived from the client query. Unlike the exploratory iterations of FIG. 1, which are user guided and provide ad hoc refinement of client queries, an iteration 743 of mining search 740 can be automated and can converge to relevant data quickly with much less computer utilization, even for a non-expert user.

Following one iteration (or, optionally, more than one iteration) of mining search, a response can also be formulated at block 740, based on the search results. Formulation can entail a variety of activities including, without limitation: ranking, sorting (e.g. based on ranks), filtering, expanding results into encompassing entities, or translation to a format, style, or language required by the client. Particularly, a mining search iteration can include a single data record, and this can be expanded to include e.g. a parent table encompassing that data record. This technique can provide results that may be relevant to the client query even though the additional records may not match the client query. Expanded results can be helpful in some situations, allowing the client to undertake further investigation outside the deep miner environment. In other situations, the encompassing table may be unreasonably large and the user may derive more benefit from a refined search via loop 743. Thus, expansion of a result into a table or other encompassing entity can be performed as an alternative to, or in addition to, subsequent iterations via loopback path 743.

At process block 745, the formulated response can be transmitted. Although the response can commonly be transmitted back to the client or user from where the client query at block 735 originated, this is not a requirement. As described herein, in some scenarios the response can be transmitted to an alternative destination.

The disclosed technologies often provide an order of magnitude or better improvement in convergence or computer utilization as compared to a conventional user-driven exploratory approach similar to that of FIG. 1. Nevertheless, a client or user is not precluded from performing additional iterations with the disclosed deep miner, in a single session. Particularly, the client or user can receive the response from block 745, perform evaluation at block 760, and the method can proceed thereafter via path 763 back to block 735, where a second client query can be received by the miner. In some situations, the client or user may seek to partition a larger search program among multiple client queries, and the second query can be predetermined. In other situations, the client or user can formulate the second client query based on the response to the first client query, e.g. to refine or redirect search based on analysis of the first response. To illustrate in the suspension problem scenario, a user may discern from the first response that an underlying problem may be associated with a particular parts supplier, and the second client query could seek information regarding other problems, not limited to suspensions, involving the same parts supplier. Illustratively, results of the first query could emerge from a structured database (e.g. a manufacturer's defect logs), while the second query could generate results (e.g. correspondence or other documents) from an unstructured data source.

Fourth Example Method

Figure 8:
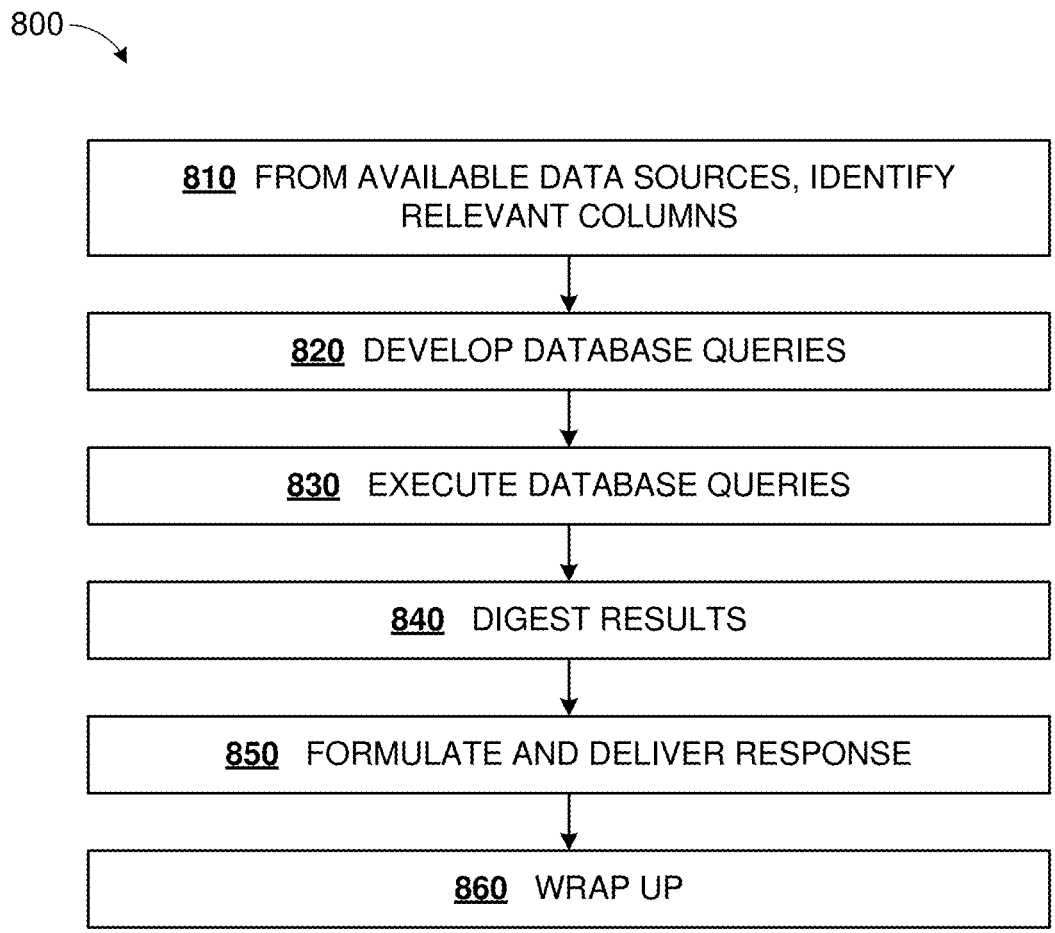
FIG. 8 is a flowchart of a fourth example method for performing a mining search according to the disclosed technologies.

FIG. 8 is a flowchart 800 of a fourth example method, illustrating additional details of a mining search procedure similar to blocks 740, 745 of FIG. 7. This method covers operational phases after receipt of a client query, until handling of the query is complete.

The method commences after a client query has been received by an innovative deep miner, similarly to block 735 of FIG. 7. At block 810, columns relevant to the client query can be identified from among the available data sources. In examples, this can entail one or more of: (i) identifying the available data sources, e.g. from client or user certificates, which together constitute a search universe, (ii) extracting search attributes from the client query, (iii) enumerating available columns in each of the available data sources, (iv) evaluating each of the available columns for relevance to the search attributes, or (v) selecting relevant columns among the available columns based on the respective evaluations. Optionally, block 810 can involve learning a map of any unstructured data source to facilitate items (iii) or (iv). The map can be learned using the facilities of the unstructured data source, or by retrieving map information previously stored by the deep miner in a cache.

With relevant columns in hand, the method can proceed to block 820, where database queries can be developed for each of the relevant columns. In examples, this can entail, for each relevant column and its respective data source, one or more of: (i) determining a search key and a search range for the instant column, (ii) determining a pattern for querying the column, according to the rules of the data source, (iii) determining a query plan that will search for the search key and search range, and can optionally include addressing any prerequisites according to the pattern, (iv) plan optimization, e.g. using resources provided by the data source, or (v) plan explanation, e.g. also using resources provided by the data source, and according to applicable constraints. Optionally, domain analysis or hierarchy path determination can also be performed at block 820. Task (ii), determining a query pattern, can be based on a vendor-provided API, as there can be variations in the prerequisites required to construct and execute a database query, and the expected process for satisfying these prerequisites. In some examples, a sequence of queries can be piped together to accomplish a desired database query. Similarly, tasks (iv) plan optimization and (v) plan explanation can leverage vendor-provided tools where available.

At block 830, the database queries can be executed on the respective data sources, to obtain respective search results.

At block 840, the results can be digested. In examples, this can entail, for each database query, one or more of: (i) translation of the results into a common intermediate format, (ii) tracing a hierarchy path, (iii) expanding the results into e.g. an encompassing table or data pool, (iv) collating the results with results from other data sources, (v) ranking the results, (vi) filtering the results, e.g. according to the ranking, or (vii) updating a cache. Optionally, analysis of the results can trigger another iteration of the instant method, with updated search attributes, or with a modified search universe.

At block 850, a response can be formulated. In examples, this can entail one or more of: (i) translating digested results into an output format, or (ii) organizing the results according to a client template. The formulated response can be delivered e.g., to the client that originated the client query. Delivery can be performed by transmission over a network.

Finally, at block 860, the method can wrap up, which can include an assortment of post-delivery activities. In examples, block 860 can include one or more of: (i) adding to the cache any of: map, query, result, or auxiliary information from the prior blocks 810-850, (ii) checking the data sources to detect stale cache information, (iii) cache maintenance, or (iv) maintain performance logs to guide e.g. future query development at block 820.

Numerous variations or extensions can be implemented within scope of the disclosed technologies, as described further herein. Notably, detailed actions within each of blocks 810-860 can be distributed among these blocks in many alternative ways.

Example Details of the Fourth Method

Figure 9:
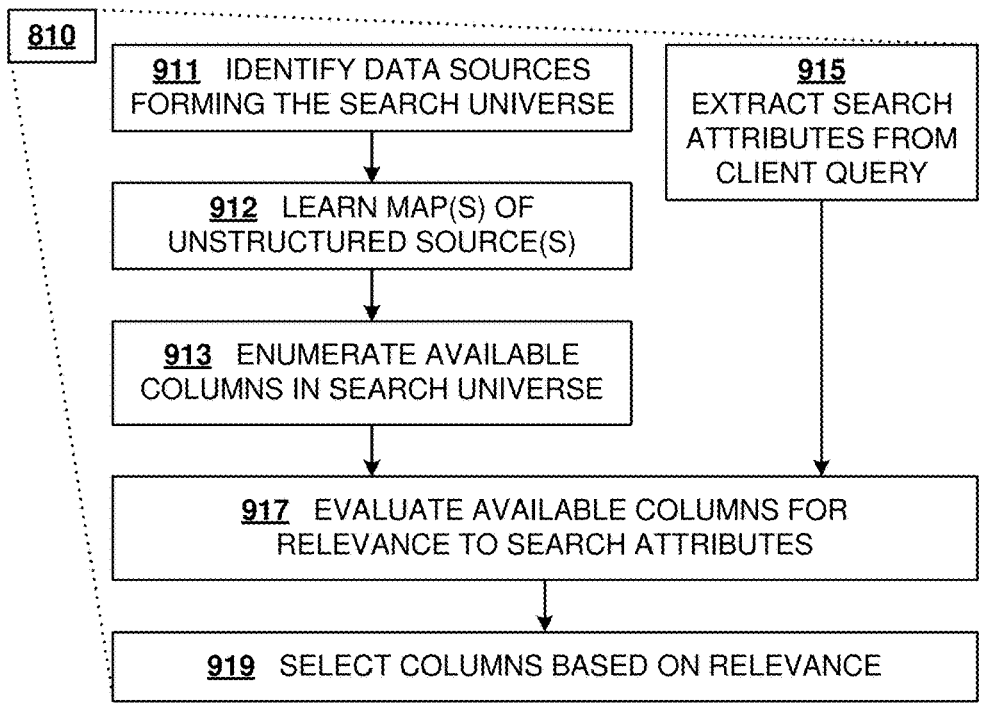
FIG. 9 is a flowchart providing example details for the method of FIG. 8.
Figure 10:
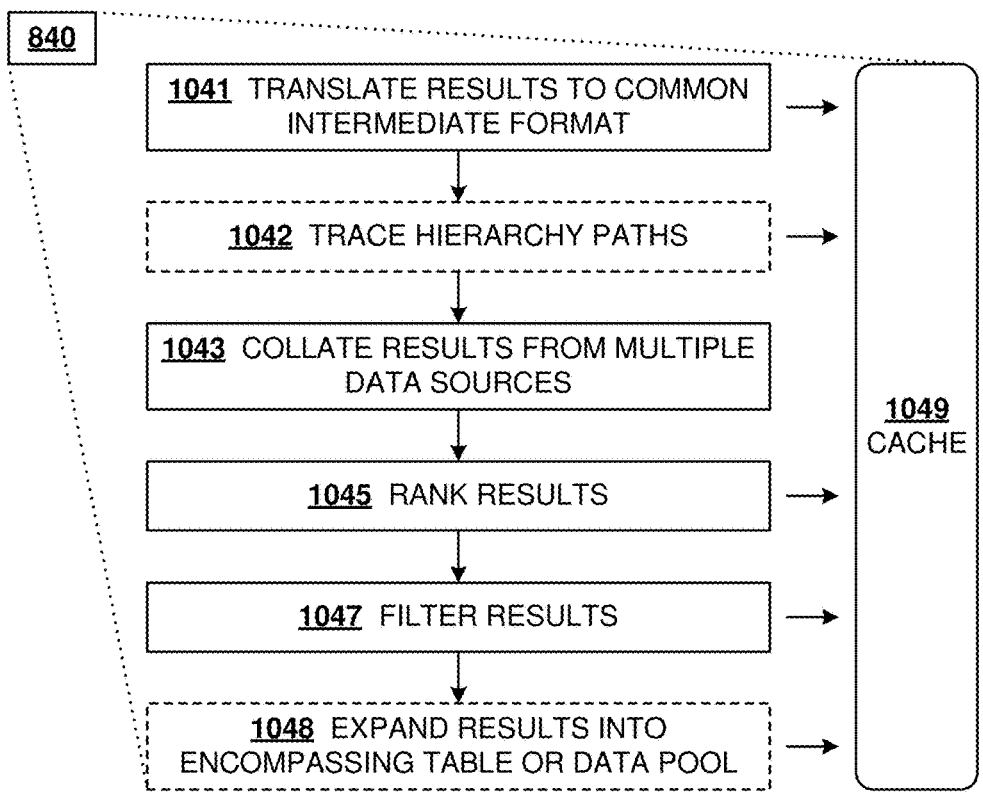
FIG. 10 is another flowchart providing example details for the method of FIG. 8.

FIGS. 9-10 are flowcharts 900, 1000 providing example details for the method of FIG. 8. The process blocks of FIG. 9 implement an example of block 810, for identifying relevant columns, while the blocks of FIG. 10 implement an example of block 840, for digesting results from database queries.

FIG. 9 commences after a client query has been received, for example at a block similar to 735 of FIG. 7. At process block 911, data sources forming the search universe are identified. In examples, these data sources can be determined from the client's certificates, or can be set interactively by a user through a miner's search interface similar to that of block 720. A user can be prompted for credentials if they are not already present. A determination can be made as to the type of each source, including whether the data source is structured or unstructured, or the underlying technology or vendor platform.

At block 912, respective maps can be learned for any unstructured sources in the search universe. At block 913, all available columns in the search universe can be enumerated. Separately, search attributes can be extracted from the client query at block 915, as described herein. Then, at block 917 the available columns can be evaluated to determine their relevance to the search attributes. As described herein, a score can be calculated for each column, based on a variety of factors including lexical or semantic match to a search attribute. The column information available for matching can include column labels, column dictionaries, descriptions, categorical values of the column, most frequently occurring values. Optionally, prior history of the column in other queries, or scores of other columns of a parent entity can also be considered. Finally, at block 919, a subset of the available columns can be selected based on the relevance scores. In examples, the columns can be selected so that there are at least a preset minimum number of columns for each search attribute, or for each data source. In examples, the columns are selected without any determination of relevance for their encompassing entities, described herein as direct identification.

The search universe, the search attributes, the selected columns, and any learned maps can be forwarded to block 820 of FIG. 8 for development and execution of database queries targeting the selected columns.

Numerous variations or extensions can be implemented within scope of the disclosed technologies. Because blocks 911-913 can be independent of the client query, one or more of these blocks can be performed once and stored in cache for a given client or user, for subsequent retrieval at block 810. In other examples, blocks 913, 917 can be performed together after block 915. A relevance score for each column can be evaluated as it is enumerated. In further examples, the hierarchy paths for the selected columns can also be calculated at block 810.

Turning to FIG. 10, flowchart 1000 commences after block 830 of FIG. 8 has obtained results for database queries against the selected columns from block 919. At block 1041, the results can be translated into a common intermediate format. In examples, the translated results can be stored in cache 1049. At block 1042, hierarchy paths for the results can be calculated. In some examples, some of the hierarchy paths can be calculated for the selected columns prior to database query execution, e.g. at block 810, hence optional block 1042 is shown in dashed outline. At block 1043, results from multiple data sources are collated, and at block 1045 the collated results are ranked. Ranks can be based on relevance, based on closeness of match to one or more search attributes, or other factors as described herein. In examples, the ranked results can also be sorted according to rank at block 1045. Based on ranking, the results can be filtered at block 1047. In some examples, at least a preset minimum number of results can be retained from each data source in the search universe, or for each search attribute. Then, in some examples, entire tables can be returned to the requesting client, rather than just the matching results from the database queries. In such cases, the remaining results can be expanded from records to tables (or data pools) at block 1048. In other examples, results can be returned directly without expansion, and block 1048 can be omitted. Hence, optional block 1048 is shown in dashed outline.

Numerous variations or extensions can be implemented within scope of the disclosed technologies, as described herein. In some examples, collation of block 1043 can be performed after filtering at 1047, and the filtered results can be collated in rank order. In other examples, the results can be grouped according to data source, or according to the search attributes for which the associated database queries were performed.

Additional Examples

The following are additional examples of the disclosed technologies.

Example 1 is a computer-implemented method, including: based one or more search attributes extracted from a client query, directly identifying one or more columns relevant to the client query, from a search universe comprising one or more data sources; executing respective database queries on the identified one or more columns to obtain results for the client query; determining respective hierarchy paths for the results; formulating a response to the client query based on the results and the respective hierarchy paths; and transmitting the response.

Example 2 includes the subject matter of Example 1, and further specifies that the client query is a natural language query.

Example 3 includes the subject matter of any of Examples 1-2, and further specifies that the one or more data sources comprise a structured database and an unstructured data source.

Example 4 includes the subject matter of any of Examples 1-3, and further specifies that the search universe comprises an unstructured data source, and the method further comprises: prior to the directly identifying, learning a map of the unstructured data source; wherein a given column, among the one or more columns and within the unstructured data source, is directly identified using the map.

Example 5 includes the subject matter of any of Examples 1-4, and further specifies that: the search universe comprises a structured database having one or more dictionaries; and a given column, among the one or more columns and within the structured database, is directly identified using the one or more dictionaries.

Example 6 includes the subject matter of any of Examples 1-5, and further includes: receiving the client query from a client; and determining the search universe from one or more certificates storing authorization of the client for the one or more data sources.

Example 7 includes the subject matter of any of Examples 1-6, and further specifies that a given one of the results is obtained from a given column of the identified one or more columns, and the determining the hierarchy path of the given result comprises tracing upwards from the given column to a corresponding data source within the search universe.

Example 8 includes the subject matter of any of Examples 1-7, and further specifies that the identified one or more columns comprise a plurality of columns and the method further comprises: assigning ranks to the columns according to a predetermined criterion; wherein the formulating is further based on the ranks.

Example 9 includes the subject matter of any of Examples 1-8, and further specifies that the database queries are first database queries, the results comprise a given result, and the method further comprises: generating a second database query targeting a column distinct from the identified columns, to search for additional results similar to the given result; and executing the second database query to obtain the additional results; wherein the response includes the additional results and additional hierarchy paths of the additional results.

Example 10 includes the subject matter of any of Examples 1-9, and further includes: maintaining a cache for future client queries; and updating the cache with on one or more of: the client query, the search attributes, the identified columns, the database queries, the results, or the hierarchy paths; wherein the search universe comprises a plurality of data sources having distinct data formats, and the results from the plurality of data sources are stored in the cache in a common intermediate format.

Example 11 includes the subject matter of Example 10, and further specifies that the client query is a first client query, the results are first results, a given one of the database queries targets a first data source, and the method further comprises: receiving a second client query overlapping the first client query; executing the given database query on an increment of the first data source to obtain incremental results; retrieving the first results and at least a first one of the hierarchy paths from the cache; and formulating a second response based on the first results, the incremental results, and the first hierarchy path.

Example 12 includes the subject matter of any of Examples 1-11, and further specifies that the formulating further comprises: associating ranks with the results; and for one or more highest ranking results among the results, incorporating one or more encompassing data structures into the response.

Example 13 is one or more computer-readable media storing instructions which, when executed by one or more hardware processors, cause the one or more hardware processors to perform operations for handling a client query received from a client, the client query associated with a search key and a search range, wherein the client is authorized to access a plurality of data sources comprising a structured first data source and an unstructured second data source, and the operations comprise: using one or more dictionaries of the first data source, finding a first column relevant to the search key; planning a first database query for the search range, for execution against the first column, the execution of the first database query leading to a first result; and tracing a first hierarchy path of the first result in the first data source; using metadata of the second data source, finding a second column relevant to the search key; planning a second database query for the search range, for execution against the second column, the execution of the second database query leading to a second result; and tracing a second hierarchy path of the second result in the second data source; and collating the first and second results for transmission to the client with the first and second hierarchy paths.

Example 14 includes the subject matter of Example 13, and further specifies that the finding the first column is performed directly, bypassing evaluation of any data structures encompassing the first column, for relevance to the search key.

Example 15 includes the subject matter of any of Examples 13-14, and further specifies that the finding the second column is performed directly, bypassing evaluation of any data structures encompassing the second column, for relevance to the search key.

Example 16 is a system, including: one or more hardware processors with memory coupled thereto; and computer-readable media storing instructions which, when executed by the one or more hardware processors, cause the one or more hardware processors to perform operations comprising: based one or more search attributes extracted from a client query, directly identifying one or more columns relevant to the client query; executing respective database queries on the identified one or more columns to obtain results for the client query; determining respective hierarchy paths for the results; formulating a response to the client query based on the results and the respective hierarchy paths; and transmitting the response.

Example 17 is a host computing environment, including: the system of claim 10; and one or more software applications configured to: provide a plurality of client queries, including the client query, to the system; and receive a corresponding plurality of responses, including the response, from the system; wherein the instructions are inaccessible from outside the host computing environment.

Example 18 includes the subject matter of Example 17, and further specifies that a given column of the identified one or more columns is external to the host computing environment.

Example 19 includes the subject matter of any of Examples 16-18 operated as a stand-alone service.

Example 20 includes the subject matter of any of Examples 16-19, and further specifies that the one or more columns are identified from a search universe comprising at least one structured database and at least one unstructured data source.

A Generalized Computer Environment

Figure 11:
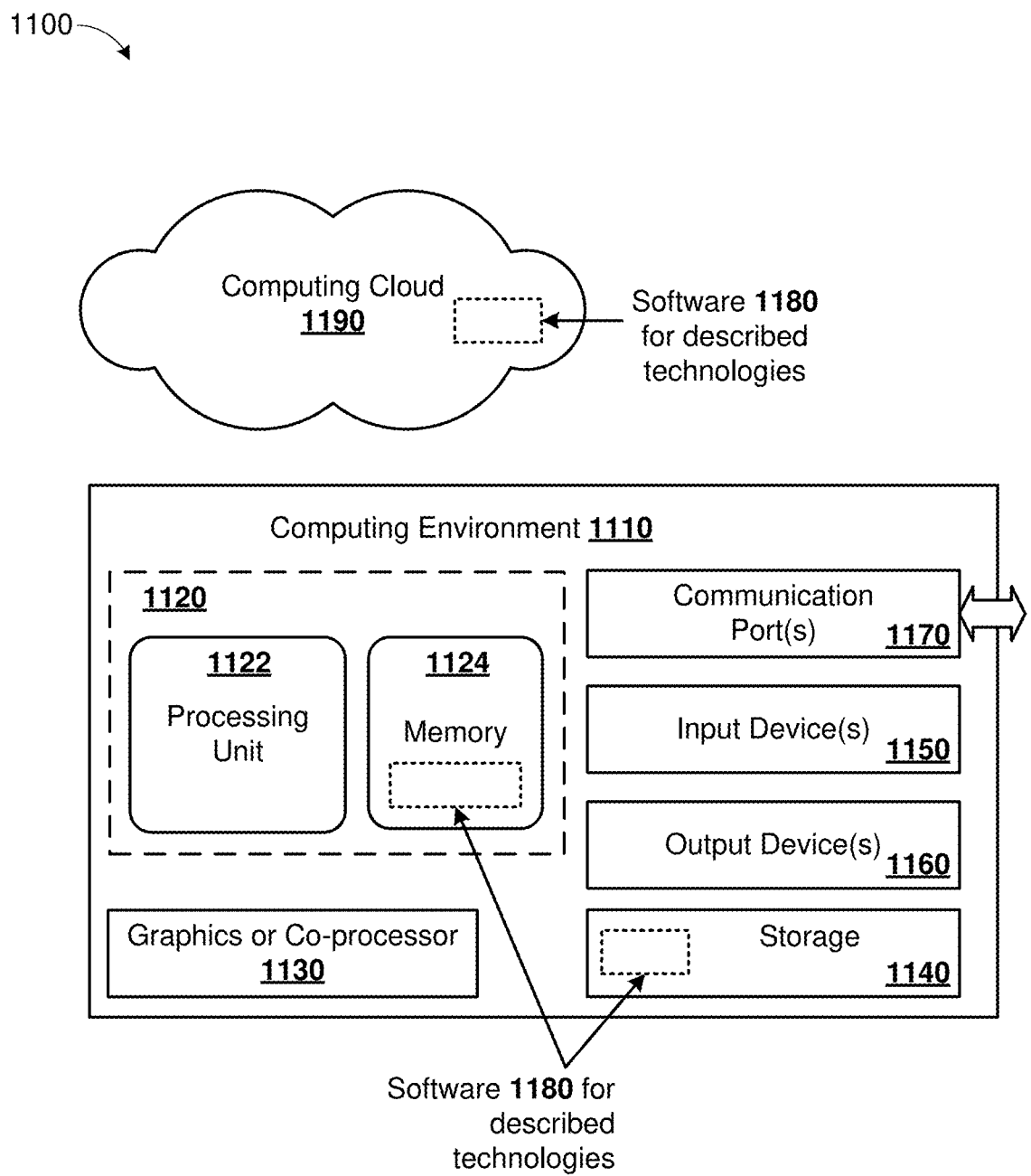
FIG. 11 is a diagram schematically depicting a computing environment suitable for implementation of disclosed technologies.

FIG. 11 illustrates a generalized example of a suitable computing system 1100 in which described examples, techniques, and technologies for search, including construction, deployment, operation, and maintenance of software, can be implemented according to disclosed technologies. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for mining or query handling (including building a search universe, processing a client query, determining relevant columns, developing database queries, executing database queries, digesting results, formulating a response, delivering a response, associated caching, maintenance, or learning operations), or various other architectures, software components, handlers, managers, modules, or services described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store client queries, search attributes, certificates, organization information of data sources, scores, ranks, identifiers of relevant columns, search keys, search ranges, database queries, results, hierarchy paths, domain information, responses, cached data; other configuration data, data structures including data tables, working tables, change logs, output structures, data values, indices, or flags, as well as other operational data.

A computing system 1110 can have additional features, such as one or more of storage 1140, input devices 1150, output devices 1160, or communication ports 1170. An interconnection mechanism (not shown) such as a bus, controller, or network interconnects the hardware components of the computing environment 1110. Typically, operating system software (not shown) provides an operating environment for other software executing in the computing environment 1110, and coordinates activities of the hardware and software components of the computing environment 1110.

The tangible storage 1140 can be removable or non-removable, and can include magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technologies are executed. Any combination of memory 1124, storage 1140, and computing cloud 1190 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system." "environment." and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 12:
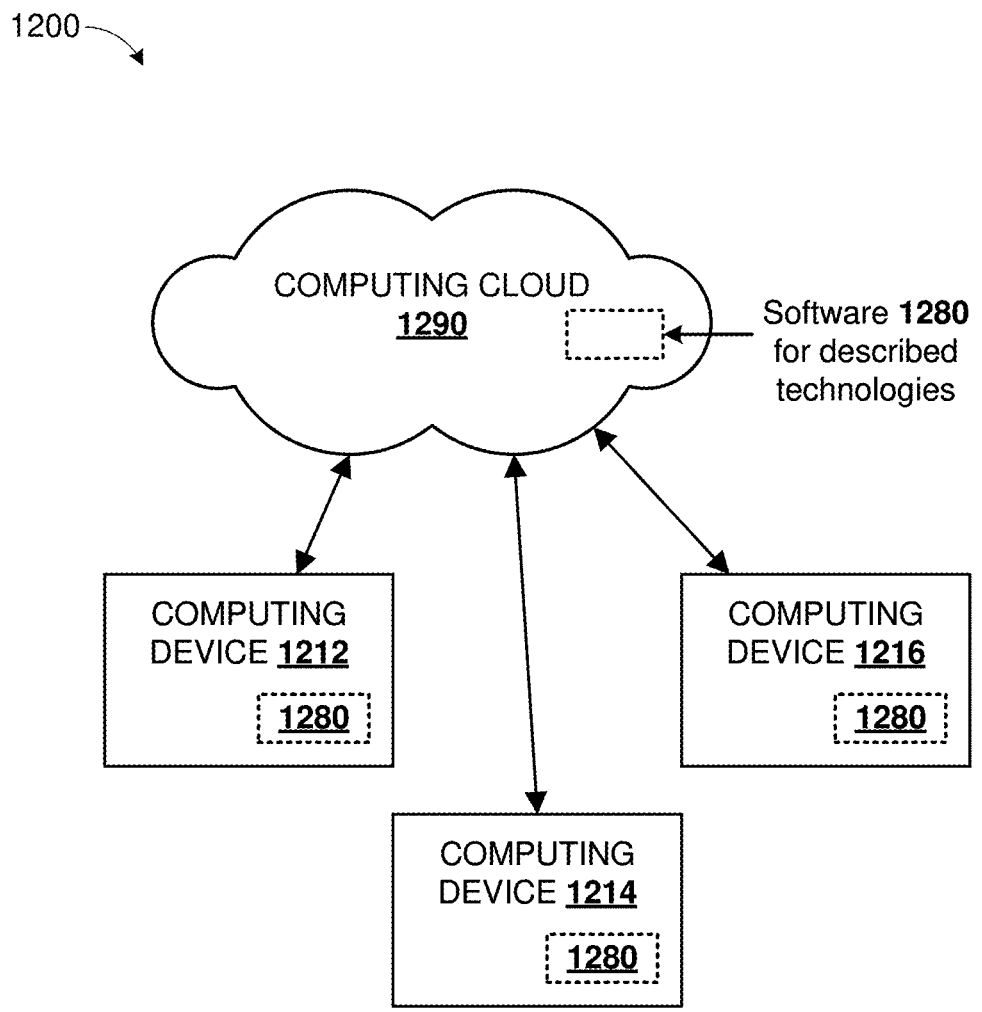
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., servers, virtual machines, embedded systems, desktop, or laptop computers), mobile devices (e.g., tablet computers, smartphones, or wearable appliances), or other types of computing devices. Communication links between computing cloud 1290 and computing devices 1212, 1214, and 1216 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and do not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "assign," "bypass." "collate." "combine," "create," "determine," "evaluate," "execute," "expand," "explain," "filter." "find," "formulate," "generate." "identify." "learn," "maintain," "modify." "navigate," "obtain," "optimize," "output." "perform," "plan," "query," "rank," "read," "receive." "request," "respond," "return," "retrieve," "search," "select." "send," "serve," "sort," "store." "target," "trace." "translate," "transmit." "update," "use," or "write," to indicate computer operations in a computer system. These terms denote actual operations that are performed or controlled by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In some examples, values, procedures, or apparatus may be referred to as "optimal." "lowest," "best." "maximum," "extremum," or the like. It will be appreciated that such descriptions are intended to indicate that a selection among a few or among many alternatives can be made, and such selections need not be lower, better, less, or otherwise preferable to other alternatives not considered.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The terms computer-readable media or computer-readable storage media do not include signals and carrier waves. In addition, the terms computer-readable media or computer-readable storage media do not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computer, hardware, and communication technologies are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed technologies may be applied, it should be recognized that the illustrated embodiments are only preferred examples and should not be taken as limiting the scope of the claims. Rather, the scope of the invention is defined by the following claims. We therefore claim all that comes within the scope and spirit of these claims.

We claim:

1. A computer-implemented method comprising:
    based on one or more search attributes extracted from a client query associated with a search key, directly identifying, by a computer system, a plurality of columns relevant to the client query from a search universe comprising data sources,
    wherein the data sources comprise a structured database and an unstructured data source,
    wherein each data source of the data sources has a plurality of columns,
    wherein each column of the plurality of columns comprises a plurality of fields from respective data records, and
    wherein the directly identifying the plurality of columns bypasses evaluation of any data structures encompassing the identified columns for relevance to the search key;
    executing, by searching the identified columns for records satisfying one or more search ranges based on a map of the unstructured data source and/or one or more dictionaries of the structured database, respective database queries on the identified columns to obtain results for the client query;
    determining, based on the executed respective database queries, respective hierarchy paths for the results by successively identifying parent entities upward from respective columns among the identified columns to respective data sources within the search universe;
    assigning ranks to at least the respective columns according to a predetermined criterion;
    formulating a response to the client query based on the ranks, the results, and the respective hierarchy paths; and
    transmitting the response to a client device.

2. The computer-implemented method of claim 1, wherein the client query is a natural language query.

3. The computer-implemented method of claim 1, further comprising:
   receiving the client query from a client; and
   determining the search universe from one or more certificates storing authorization of the client for the one or more data sources.

4. The computer-implemented method of claim 1, wherein a given result of the results is obtained from a given column of the identified one or more columns, and the determining the hierarchy path of the given result comprises tracing upwards from the given column to a corresponding data source within the search universe.

5. The computer-implemented method of claim 1, wherein the database queries are first database queries, the results comprise a given result, and the method further comprises:
   generating a second database query targeting a column distinct from the identified columns to search for additional results similar to the given result; and
   executing the second database query to obtain the additional results;
   wherein the response includes the additional results and additional hierarchy paths of the additional results.

6. The computer-implemented method of claim 1, further comprising:
   maintaining a cache for future client queries; and
   updating the cache with on one or more of: the client query, the search attributes, the identified columns, the database queries, the results, or the hierarchy paths;
   wherein the search universe comprises a plurality of data sources having distinct data formats, and the results from the plurality of data sources are stored in the cache in a common intermediate format.

7. The computer-implemented method of claim 6, wherein the client query is a first client query, the results are first results, a given database query of the database queries targets a first data source, and the method further comprises:
   receiving a second client query overlapping the first client query;
   executing the given database query on an increment of the first data source to obtain incremental results;
   retrieving the first results and at least a first one hierarchy path of the hierarchy paths from the cache; and
   formulating a second response based on the first results, the incremental results, and the first hierarchy path.

8. The computer-implemented method of claim 1, wherein the formulating further comprises:
   associating ranks with the results; and
   for one or more highest ranking results among the results, incorporating one or more encompassing data structures into the response.

9. The computer-implemented method of claim 1, wherein the client query is associated with a search range, the identified one or more columns comprise a first column of the structured database and a second column of the unstructured data source, and further wherein:
   the first and second columns are identified as being relevant to the search key;
   the identifying the first column is performed using one or more dictionaries of the structured database;
   the identifying the second column is performed using metadata of the unstructured data source;
   the executing the database queries for the first and second columns are performed over the search range and lead respectively to first and second results of the results;
   the formulating the response comprises collating the first and second results with the hierarchy paths for the first and second results; and
   the response is transmitted to a client from which the client query was received.

10. A system comprising:
    one or more hardware processors with memory coupled thereto; and
    computer-readable media storing instructions which, when executed by the one or more hardware processors, cause the one or more hardware processors to perform operations comprising:
      based on one or more search attributes extracted from a client query associated with a search key, directly identifying a plurality of columns relevant to the client query from a search universe comprising data sources,
        wherein the data sources comprise a structured database and an unstructured data source,
        wherein each data source of the data sources has a plurality of columns,
        wherein each column of the plurality of columns comprises a plurality of fields from respective data records, and
        wherein the directly identifying the plurality of columns bypasses evaluation of any data structures encompassing the identified columns for relevance to the search key;
      executing, by searching the identified columns for records satisfying one or more search ranges based on a map of the unstructured data source and/or one or more dictionaries of the structured database, respective database queries on the identified columns to obtain results for the client query;
      determining, based on the executed respective database queries, respective hierarchy paths for the results by successively identifying parent entities upward from respective columns among the identified columns to respective data sources within the search universe;
      assigning ranks to at least the respective columns according to a predetermined criterion;
      formulating a response to the client query based on the ranks, the results, and the respective hierarchy paths; and
      transmitting the response to a client device.

11. The system of claim 10 operated as a stand-alone service.

12. A host computing environment, comprising:
    a system, wherein the system comprises:
      one or more hardware processors with memory coupled thereto; and
      computer-readable media storing instructions which, when executed by the one or more hardware processors, cause the one or more hardware processors to perform operations comprising:
        based on one or more search attributes extracted from a client query associated with a search key, directly identifying a plurality of columns relevant to the client query from a search universe comprising data sources,
          wherein the data sources comprise a structured database and an unstructured data source,
          wherein each data source of the data sources has a plurality of columns,
          wherein each column of the plurality of columns comprises a plurality of fields from respective data records, and wherein the directly identifying the plurality of columns bypasses evaluation of any data structures encompassing the identified columns for relevance to the search key;

executing, by searching the identified columns for records satisfying one or more search ranges based on a map of the unstructured data source and/or one or more dictionaries of the structured database, respective database queries on the identified columns to obtain results for the client query;

determining, based on the executed respective database queries, respective hierarchy paths for the results by successively identifying parent entities upward from respective columns among the identified columns to respective data sources within the search universe;

assigning ranks to at least the respective columns according to a predetermined criterion;

formulating a response to the client query based on the ranks, the results, and the respective hierarchy paths; and transmitting the response to a client device; and one or more software applications configured to:

provide a plurality of client queries, including the client query, to the system; and receive a corresponding plurality of responses, including the response, from the system;

wherein the instructions are inaccessible from outside the host computing environment.

13. The host computing environment of claim 12, wherein a given column of the identified one or more columns is external to the host computing environment.

* * * * *